(12) United States Patent
Kataoka et al.

(10) Patent No.: US 8,265,872 B2
(45) Date of Patent: Sep. 11, 2012

(54) ROAD SURFACE DIVISION MARK RECOGNITION APPARATUS, AND LANE DEPARTURE PREVENTION APPARATUS

(75) Inventors: Hiroaki Kataoka, Nishikamo-gun (JP); Shioya Kageyama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 451 days.

(21) Appl. No.: 12/554,434

(22) Filed: Sep. 4, 2009

(65) Prior Publication Data

US 2010/0060738 A1    Mar. 11, 2010

(30) Foreign Application Priority Data

Sep. 8, 2008   (JP) ................................ 2008-229938

(51) Int. Cl.
*B60W 30/12* (2006.01)
(52) U.S. Cl. ......... 701/514; 701/523; 701/301; 382/104
(58) Field of Classification Search ................... 701/514
See application file for complete search history.

(56) References Cited

U.S. PATENT DOCUMENTS

| | | | | |
|---|---|---|---|---|
| 5,983,157 | A * | 11/1999 | Sugitani ........................ | 701/400 |
| 7,679,498 | B2 * | 3/2010 | Pawlicki et al. .............. | 340/435 |
| 7,786,898 | B2 * | 8/2010 | Stein et al. .................... | 340/937 |
| 2003/0218676 | A1 * | 11/2003 | Miyahara ...................... | 348/148 |
| 2006/0206243 | A1 * | 9/2006 | Pawlicki et al. ................. | 701/1 |
| 2008/0036576 | A1 * | 2/2008 | Stein et al. ................. | 340/425.5 |
| 2008/0199045 | A1 * | 8/2008 | Ekin .............................. | 382/104 |
| 2010/0020170 | A1 * | 1/2010 | Higgins-Luthman et al. ............................. | 348/135 |
| 2011/0001640 | A1 * | 1/2011 | Kageyama et al. ...... | 340/995.24 |
| 2012/0050074 | A1 * | 3/2012 | Bechtel et al. ................ | 340/988 |

FOREIGN PATENT DOCUMENTS

| | | |
|---|---|---|
| DE | 602 02 341 T2 | 12/2005 |
| EP | 1 320 072 A2 | 6/2003 |
| JP | 2001-88609 A | 4/2001 |
| JP | 2002-90851 A | 3/2002 |
| JP | 2002-320126 A | 10/2002 |
| JP | 2003-228711 | 8/2003 |
| JP | 2007-300368 A | 11/2007 |
| JP | 2008-30619 | 2/2008 |
| JP | 2008-165610 | 7/2008 |

OTHER PUBLICATIONS

U.S. Appl. No. 12/865,824, filed Aug. 2, 2010, Kageyama et al.
German Office Action issued May 21, 2012 in German Application No. 10 2009 029 243.8 (w/ English translation).

\* cited by examiner

*Primary Examiner* — Shelley Chen
(74) *Attorney, Agent, or Firm* — Oblon, Spivak, McClelland, Maier & Neustadt, L.L.P.

(57) ABSTRACT

A road surface division mark recognition apparatus includes: a vehicle-mounted camera that takes an image of a road surface ahead of a vehicle; an image processing portion which has a plurality of image processing modes that correspond respectively to a plurality of kinds of road surface division marks, and which recognizes a road surface division mark in a selected image processing mode; a temperature measurement portion that measures the temperature of the vehicle-mounted camera; and a restriction portion that restricts the action of the vehicle-mounted camera if the temperature measured by the temperature measurement portion is higher than or equal to a threshold value. The threshold value differs between the image processing modes.

4 Claims, 15 Drawing Sheets

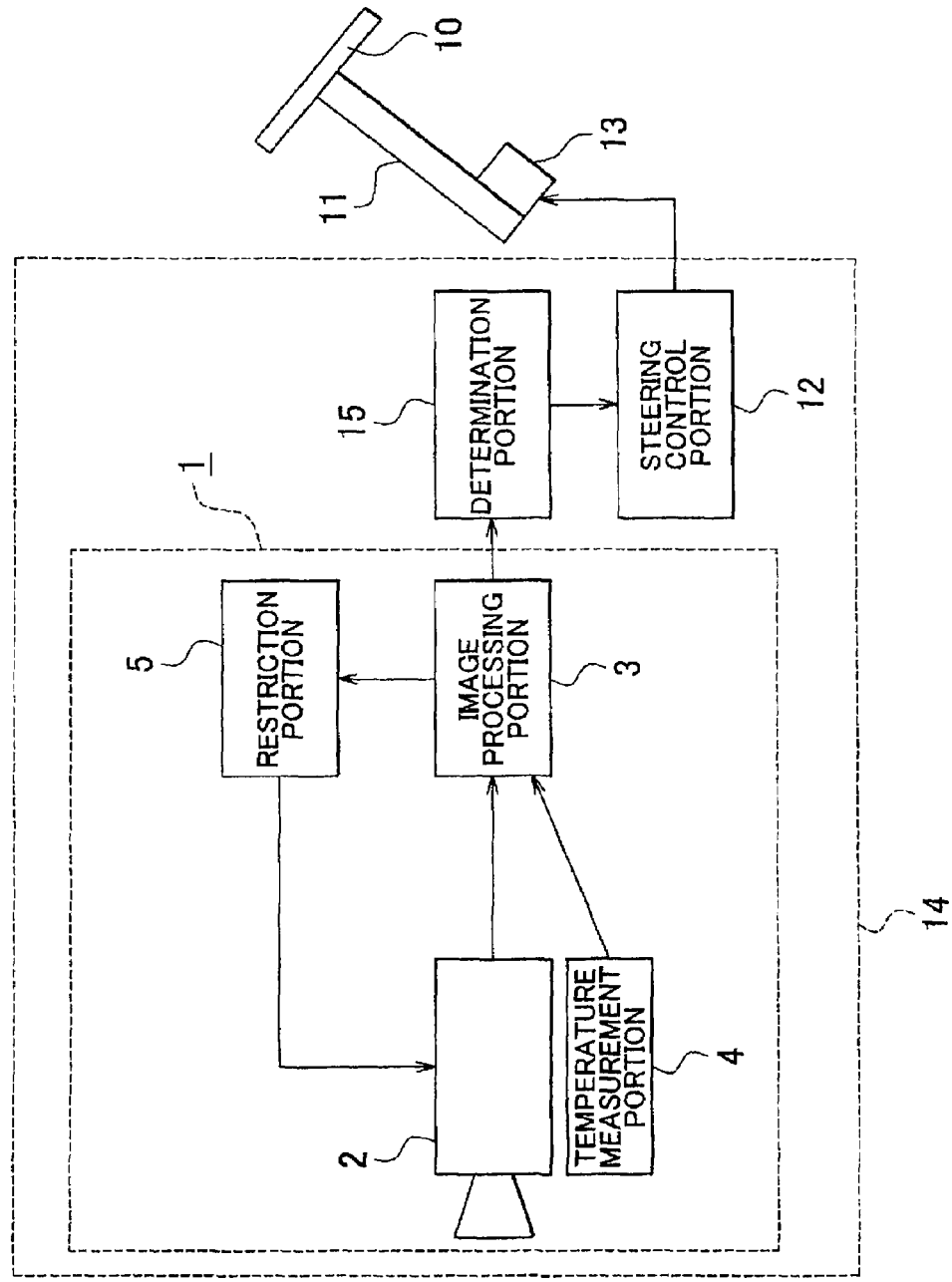

ROAD SURFACE DIVISION MARK RECOGNITION APPARATUS, AND LANE DEPARTURE PREVENTION APPARATUS

INCORPORATION BY REFERENCE

The disclosure of Japanese Patent Application No. 2008-229938 filed on Sep. 8, 2008 including the specification, drawings and abstract is incorporated herein by reference in its entirety.

BACKGROUND OF THE INVENTION

1. Field of the Invention

The invention relates to a road surface division mark recognition apparatus, and a lane departure prevention apparatus. More particularly, the invention relates to a road surface division mark recognition apparatus and a lane departure prevention apparatus that maintain high serviceability ratio even at high temperature.

2. Description of the Related Art

In recent years, a lane departure prevention apparatus that includes a white line recognition portion that recognizes a white line on a road on the basis of a picked-up image acquired by a vehicle-mounted camera, and a steering control portion that controls the steering so that the vehicle does not depart from the traveling lane, on the basis of the positional relationship between the vehicle and the white line recognized by the white line recognition portion has been being put to practical use.

As an image pickup element of the vehicle-mounted camera, a CCD (charge coupled device) is used in many cases. The vehicle-mounted camera is often provided near a cabin-side site on an upper portion of the windshield, and the vicinity of the windshield is likely to have high temperature due to the influence of sunshine. The imaging performance of the CCDs is susceptible to be affected by thermal electrons that occur at high temperature. If a CCD is affected by thermal electrons, noise occurs in picked-up images. If the amount of noise occurring in a picked-up image increases, there arises a possibility of the white line recognition portion failing to accurately recognize a white line on a road. If the white line recognition portion fails to accurately recognize a white line, it may become impossible for the lane departure prevention apparatus to certainly prevent the vehicle from departing from the traveling lane.

A technology described in Japanese Patent Application Publication No. 2001-88609 (JP-A-2001-88609) prevents a vehicle-mounted camera from operating at high temperature. This technology measures the temperature of the vehicle-mounted camera, and stops the action of the vehicle-mounted camera by stopping the supply of electric power to the vehicle-mounted camera if the measured temperature of the camera is higher than or equal to a threshold value. This prevents the vehicle-mounted camera from operating at such a high temperature that much noise occurs in a picked-up image.

However, when the vehicle-mounted camera has stopped, the white line recognition portion cannot recognize a white line, and the lane departure prevention apparatus cannot prevent lane departure of the vehicle. Therefore, at high temperature, the serviceability ratio of the lane departure prevention apparatus declines. Hence, a white line recognition apparatus and a lane departure prevention apparatus whose decline in serviceability ratio is minimized even at high temperature have been desired.

SUMMARY OF THE INVENTION

In the invention, the serviceability ratio of the white line recognition apparatus and the lane departure prevention apparatus is improved by avoiding unnecessary stop of the vehicle-mounted camera at high temperature.

The term "road surface division mark" in the invention is a division mark that is displayed on a road surface. The "road surface division mark" may include marks that define a traveling lane of vehicles on a road surface, and that are generally termed vehicular road center lines, lane-dividing lines, vehicular road outer side lines, etc., and may also include marks that define parking areas in a parking lot. Examples of the configurations of the road surface division mark include road surface division marks that are expressed by a white line, road pavement markers, a yellow line, stones, etc. There exist various white lines in different configurations, for example, a long continuous white line, a white line formed by continually aligned line segments of about 1 to 10 meters, a white line formed by circular dots that are aligned as in a dotted line (used mainly for defining a traveling lane in the United States, and called Botts' dots).

A road surface division mark recognition apparatus in accordance with a first aspect of the invention recognizes a division mark on a road surface. The road surface division mark recognition apparatus includes: a vehicle-mounted camera that takes an image of the road surface; an image processing portion which has a plurality of image processing modes that correspond respectively to a plurality of kinds of road surface division marks, and which recognizes the road surface division mark in a selected one of the image processing modes; a temperature measurement portion that measures temperature of the vehicle-mounted camera; and a restriction portion that restricts action of the vehicle-mounted camera if the temperature measured by the temperature measurement portion is higher than or equal to a threshold value. The threshold value differs depending on the image processing modes.

According to the first aspect, the image processing portion has a plurality of image processing modes. For example, the image processing portion may select, from the plurality of image processing modes, an image processing mode that corresponds to the road surface division mark that is contained in a road surface image. The usable temperature range of the vehicle-mounted camera (i.e., a range of temperature in which the road surface division marks can be accurately recognized) differs between the image processing modes. For example, the upper limit value of the usable temperature range in an image processing mode in which a long continuous white line is recognized is higher than the upper limit value of the usable temperature range in an image processing mode in which a white line in the form of a dotted line is recognized. This is because the image processing mode of recognizing a long continuous white line is less susceptible to be affected by thermal noise (i.e., is higher in the robustness to thermal noise) during the white-line recognition process than the image processing mode of recognizing a white line in a dotted-line form. Therefore, the threshold value can be made to differ between the image processing modes by adjusting the threshold value to the upper limit value of the usable temperature range of the vehicle-mounted camera or to the vicinity of the upper limit value, separately for each image processing mode. By making the threshold value different between the image processing modes in this manner, unnecessary stop of the vehicle-mounted camera at high temperature is avoided, so that the capability of the vehicle-mounted camera can be fully delivered, and the serviceability ratio of the road surface division mark recognition apparatus can be improved.

In the first aspect of the invention, the restriction portion may restrict the action of the vehicle-mounted camera by restricting supply of electric power to the vehicle-mounted camera.

According to this construction, since the supply of electric power to the vehicle-mounted camera is restricted when the action of the vehicle-mounted camera is to be restricted, electric power can be saved.

Besides, in the first aspect, the threshold value used when the image processing mode is a Botts' dots recognition mode may be set lower than the threshold value used when the image processing mode is a division line recognition mode.

The "division line" in this invention refers to a line-shape road surface division mark. For example, the division line refers to a long continuous white line, and a white line formed by continually aligned line segments of about 1 to 10 meters. The division line may also be a yellow line instead of a white line. The "Botts' dots" in the invention refers to a road surface division mark formed by a continual alignment of white or yellow circular dots in the form of a dotted line. The division line recognition mode is less susceptible to thermal noise (i.e., is higher in the robustness to thermal noise) during the road surface division mark recognition process than the Botts' dots recognition mode. Therefore, according to this construction, threshold values that correspond respectively to the division line recognition mode and to the Botts' dots recognition mode can be set so that the capability of the vehicle-mounted camera can be fully delivered in each of the recognition modes.

In the first aspect, the image processing portion, after discerning the kind of a road surface division mark, may select from the plurality of image processing modes an image processing mode that corresponds to the road surface division mark discerned.

According to this construction, the image processing portion is able to select an appropriate image processing mode that corresponds to the discerned road surface division mark. Hence, there is no need for the user to perform an operation of selecting an image processing mode.

A road surface division mark recognition apparatus in accordance with a second aspect of the invention recognizes a division mark on a road surface. The road surface division mark recognition apparatus includes: a vehicle-mounted camera that takes an image of the road surface; an image processing portion that calculates an edge point distribution of a region whose brightness is different from brightness of a surrounding region based on the image of the road surface taken by the vehicle-mounted camera, and that calculates a degree of dirtiness of the road surface and recognizes a road surface division mark based on the edge point distribution calculated; a temperature measurement portion that measures temperature of the vehicle-mounted camera; and a restriction portion that restricts action of the vehicle-mounted camera if the temperature measured by the temperature measurement portion is higher than or equal to a threshold value. The threshold value is set according to the degree of dirtiness of the road surface.

According to the foregoing second aspect of the invention, the threshold value that is a criterion as to whether or not to restrict the action of the vehicle-mounted camera is set according to the degree of dirtiness of the road surface. The susceptibility to thermal noise during the road surface division mark recognition process is lower (i.e., the robustness to thermal noise during the recognition process is higher) when the degree of dirtiness of the road surface is relatively small.

Therefore, in the case where the degree of dirtiness of the road surface is small, the threshold value may be set higher than in the case where the degree of dirtiness of the road surface is great. Hence, unnecessary stop of the vehicle-mounted camera at high temperature is avoided, so that the capability of the vehicle-mounted camera can be fully delivered, and the serviceability ratio of the road surface division mark recognition apparatus can be improved.

A lane departure prevention apparatus in accordance with a third aspect of the invention prevents a vehicle from departing from a traveling lane. The lane departure prevention apparatus includes: a vehicle-mounted camera that takes an image of a road surface; an image processing portion that recognizes a road surface division mark that defines the traveling lane based on the image of the road surface taken by the vehicle-mounted camera; a temperature measurement portion that measures temperature of the vehicle-mounted camera; a restriction portion that restricts action of the vehicle-mounted camera if the temperature measured by the temperature measurement portion is higher than or equal to a threshold value; a determination portion that makes a determination regarding possibility of the vehicle departing from the traveling lane based on a result of recognition by the image processing portion; and a steering control portion that controls steering so that the vehicle does not depart from the traveling lane based on a result of determination by the determination portion. The steering control portion controls the steering by changing a control gain of rotary torque that is given to a steering shaft, and the threshold value is set according to magnitude of the control gain.

According to the third aspect, the threshold value that is a criterion as to whether or not to restrict the action of the vehicle-mounted camera is set according to the magnitude of the control gain. For example, the threshold value may be set so as to be higher with a reduction in the control gain. Due to this, unnecessary stop of the vehicle-mounted camera at high temperature is avoided, so that the capability of the vehicle-mounted camera can be fully delivered, and the serviceability ratio of the lane departure prevention apparatus can be improved.

A lane departure prevention apparatus in accordance with a fourth aspect of the invention prevents a vehicle from departing from a traveling lane. The lane departure prevention apparatus includes: a vehicle-mounted camera that takes an image of a road surface; an image processing portion that recognizes a road surface division mark that defines the traveling lane based on the image of the road surface taken by the vehicle-mounted camera; a temperature measurement portion that measures temperature of the vehicle-mounted camera; a restriction portion that restricts action of the vehicle-mounted camera if the temperature measured by the temperature measurement portion is higher than or equal to a threshold value; a determination portion that makes a determination regarding possibility of the vehicle departing from the traveling lane based on a result of recognition by the image processing portion; and a warning output portion that outputs a warning that indicates possibility of departure from the traveling lane, before the vehicle departs from the traveling lane, based on a result of determination by the determination portion. The threshold value is set according to a warning timing that is set in the warning output portion.

According to the fourth aspect, the threshold value that is a criterion as to whether or not to restrict the action of the vehicle-mounted camera is set according to the warning timing. When the warning timing is late, the recognition accuracy of the road surface division mark is higher than when the warning timing is early. A reason for this is that when the warning timing is early, road surface information needs to be acquired about a farther forward area of the road surface than when the warning timing is late, and therefore the influence of noise is greater. Therefore, the threshold value may be set higher when the warning timing is late than when the warning timing is early. Hence, unnecessary stop of the vehicle-mounted camera at high temperature is avoided, so that the capability of the vehicle-mounted camera can be fully delivered, and therefore the serviceability ratio of the lane departure prevention apparatus can be improved.

In the fourth aspect, the warning timing may be a time that indicates how many seconds prior to an expected time of departure of the vehicle from the traveling lane the warning is to be output.

In the foregoing construction, the threshold value may be set higher when the amount of time preceding the expected time of lane departure (i.e., the warning timing) is short than when that amount of time is long. According to this construction, unnecessary stop of the vehicle-mounted camera at high temperature is avoided, so that the capability of the vehicle-mounted camera can be fully delivered, and therefore the serviceability ratio of the lane departure prevention apparatus can be improved.

A lane departure prevention apparatus in accordance with a fifth aspect of the invention prevents a vehicle from departing from a traveling lane. The lane departure prevention apparatus includes: a vehicle-mounted camera that takes an image of a road surface; an image processing portion that recognizes a road surface division mark that defines the traveling lane based on the image of the road surface taken by the vehicle-mounted camera; a temperature measurement portion that measures temperature of the vehicle-mounted camera; a determination portion that makes a determination regarding possibility of the vehicle departing from the traveling lane based on a result of recognition by the image processing portion; and a steering control portion that controls steering so that the vehicle does not depart from the traveling lane based on a result of determination by the determination portion. The steering control portion controls the steering by changing a control gain of rotary torque that is given to a steering shaft. The lane departure prevention apparatus further includes a control gain adjustment portion that adjusts the control gain according to the temperature measured by the temperature measurement portion.

According to the fifth aspect, the control gain adjustment portion adjusts the control gain according to the temperature of the vehicle-mounted camera. For example, the control gain may be adjusted so that the control gain lessens with an increase in the temperature of the vehicle-mounted camera. Due to this, good steering feeling can be maintained even in the case where the vehicle-mounted camera is affected by thermal noise. Besides, since unnecessary stop of the vehicle-mounted camera at high temperature is avoided, the serviceability ratio of the lane departure prevention apparatus can be improved.

A lane departure prevention apparatus in accordance with a sixth aspect of the invention prevents a vehicle from departing from a traveling lane. The lane departure prevention apparatus includes: a vehicle-mounted camera that takes an image of a road surface; an image processing portion that recognizes a road surface division mark that defines the traveling lane based on the image of the road surface taken by the vehicle-mounted camera; a temperature measurement portion that measures temperature of the vehicle-mounted camera; a determination portion that makes a determination regarding possibility of the vehicle departing from the traveling lane based on a result of recognition by the image processing portion; and a warning output portion that outputs a warning that indicates a possibility of departure from the traveling lane based on a result of determination by the determination portion. The lane departure prevention apparatus further includes a timing adjustment portion that adjusts a timing of the warning according to the temperature measured by the temperature measurement portion.

According to the sixth aspect, the timing adjustment portion adjusts the warning timing according to the temperature of the vehicle-mounted camera. When the warning timing is late, the recognition accuracy of the road surface division mark is higher than when the warning timing is early. A reason for this is that when the warning timing is early, road surface information needs to be acquired about a farther forward area of the road surface than when the warning timing is late, and therefore the influence of noise is greater. Hence, the warning timing is adjusted so as to be later with an increase in the temperature of the vehicle-mounted camera. Due to this, false warning output can be prevented even in the case where the vehicle-mounted camera is affected by thermal noise. Besides, since unnecessary stop of the vehicle-mounted camera at high temperature is avoided, the serviceability ratio of the lane departure prevention apparatus can be improved.

In the sixth aspect, the warning timing may be a time that indicates how many seconds prior to an expected time of departure of the vehicle from the traveling lane the warning is to be output, and the timing adjustment portion may gradually shorten the warning timing with an increase in the temperature.

According to this construction, the warning timing gradually shortens with increases in the temperature of the vehicle-mounted camera. Hence, false warning output can be prevented even in the case where the vehicle-mounted camera is affected by thermal noise.

According to the invention, unnecessary stop of the vehicle-mounted camera at high temperature is avoided, so that the capability of the vehicle-mounted camera can be fully delivered, and therefore the serviceability ratio of the road surface division mark recognition apparatus and the lane departure prevention apparatus can be improved.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 1 is a block diagram showing a construction of a road surface division mark recognition apparatus in accordance with a first embodiment of the invention;

DETAILED DESCRIPTION OF EMBODIMENTS

Road Surface Division Mark Recognition Apparatus

Figure 2A:
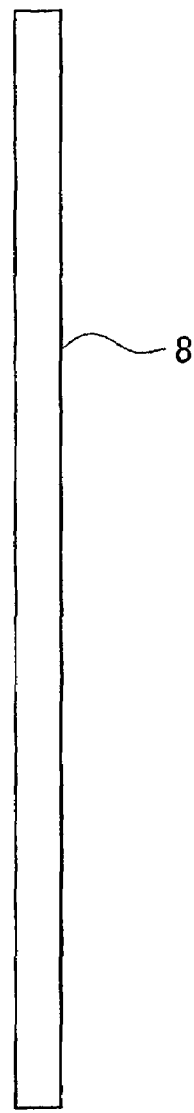
FIG. 2A, FIG. 2B, and FIG. 2C are diagrams showing examples of road surface division marks on a road surface.
Figure 2B:
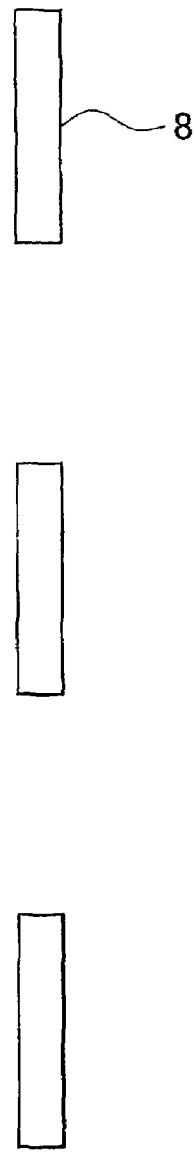
Figure 2C:
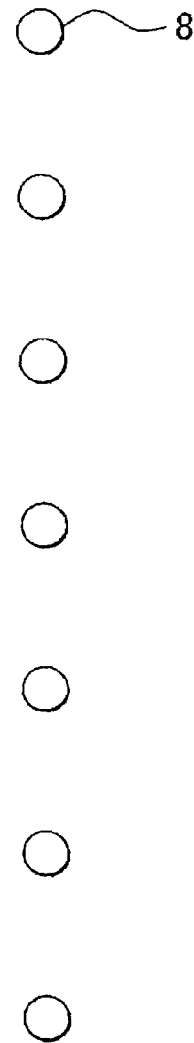

A road surface division mark recognition apparatus in accordance with a first embodiment of the invention will be described with reference to drawings. FIG. 1 is a block diagram showing a construction of a lane division mark recognition apparatus in accordance with the first embodiment. FIGS. 2A to 2C are diagrams showing examples of road surface division marks.

A road surface division mark recognition apparatus 1 in accordance with the first embodiment recognizes road surface division marks that define traveling lanes. The road surface division mark recognition apparatus 1 constitutes, for example, a portion of a lane departure prevention apparatus 14. The lane departure prevention apparatus 14 includes the road surface division mark recognition apparatus 1, a determination portion 15, and a steering control portion 12. The determination portion 15 determines the possibility of the vehicle departing from the traveling lane, on the basis of a result of the recognition of the road surface division mark recognition apparatus 1. The steering control portion 12 controls the steering so that the vehicle does not depart from the traveling lane, on the basis of a result of the determination of the determination portion 15. Concretely, the steering control portion 12 controls a power steering motor 13 that rotates and drives a steering shaft 11. By the steering control portion 12 controlling the power steering motor 13, rotary torque is given to the steering shaft 11 so as to prevent lane departure of the vehicle. A steering wheel 10 is fitted to the steering shaft 11.

Hereinafter, the road surface division mark recognition apparatus 1 will be described in detail. The road surface division mark recognition apparatus 1 includes a vehicle-mounted camera 2, an image processing portion 3, a temperature measurement portion 4, and a restriction portion 5.

The vehicle-mounted camera 2 takes images of a road surface ahead of the vehicle. The vehicle-mounted camera 2 is equipped with, for example, a CCD (charge coupled device), as an image pickup element. The vehicle-mounted camera 2 is disposed, for example, near a cabin-side site on an upper portion of the windshield of the vehicle, and takes images of a road surface ahead of the vehicle, through the windshield.

The temperature measurement portion 4 measures the temperature of the vehicle-mounted camera 2.

The image processing portion 3 recognizes a road surface division mark 8 that defines a traveling lane, on the basis of a road surface image taken by the vehicle-mounted camera 2. The road surface division mark 8 in this embodiment is a mark that defines a traveling lane for vehicles on a road surface, and is generally termed a vehicular road center line, a lane-dividing line, a vehicular road outer side line, etc. Examples of the configuration of the road surface division mark 8 include road division lines expressed by a white line, road pavement markers, a yellow line, stones, etc. There exist various white lines in different configurations, for example, a long continuous white line as shown in FIG. 2A, a white line formed by continually aligned line segments of about 1 to 10 meters as shown in FIG. 2B, a white line formed by dots that are aligned as in a dotted line as shown in FIG. 2C (which is used mainly for defining a traveling lane in the United States, and is called Botts' dots). The white lines cited herein may be a single line, or a double line formed by two adjacent lines that extend parallel to each other.

The image processing portion 3 is able to recognize the road surface division mark 8 by, for example, processing a road surface image by a known method. Concretely, the image processing portion 3 calculates an edge point distribution of each of regions whose brightness is different from that of a surrounding region, for example, a region whose brightness is conspicuously higher than those of surrounding regions, and a region whose brightness is conspicuously lower than those of surrounding regions. On the basis of the calculated edge point distributions, the image processing portion 3 calculates the degree of dirtiness of the road surface, and recognizes the road surface division mark 8. Usually, a region whose brightness is conspicuously higher than those of surrounding regions corresponds to the road surface division mark 8, and a region whose brightness is conspicuously lower than those of surrounding regions corresponds to a smudged portion of the road surface (e.g., a portion that has been repaired with coal tar or the like).

The image processing portion 3 has a plurality of image processing modes that correspond respectively to a plurality of kinds of road surface division marks 8. The image processing portion 3 discerns the kind of a road surface division mark 8 that is contained in a road surface image that is taken by the vehicle-mounted camera 2, and selects one of the image processing modes that corresponds to the discerned kind of road surface division mark 8, and recognizes the road surface division mark 8 in the selected image processing mode. Examples of the image processing modes include a division line recognition mode, and a Botts' dots recognition mode. The division line recognition mode includes, for example, a both-side division line recognition mode that is entered in the case where road surface division lines exist on the left and right sides of a traveling lane, and a one-side division line recognition mode that is entered in the case where a road surface division line exists on only one of the left side and the right side of a traveling lane.

The usable temperature range of the vehicle-mounted camera 2 (i.e., a temperature range in which the camera 2 can accurately recognize the road surface division mark 8) differs between the image processing modes. For example, the upper limit value of the usable temperature range used in a mode of recognizing a long continuous white line is higher than the upper limit value of the usable temperature range used in the mode of recognizing Botts' dots. This is because the mode of recognizing a long continuous white line is less susceptible to thermal noise (i.e., is higher in the robustness to thermal noise) during the white-line recognition process than the mode of recognizing Botts' dots.

The restriction portion 5 restricts the action of the vehicle-mounted camera 2 in the case where the temperature measured by the temperature measurement portion 4 is higher than or equal to a threshold value Th. The threshold value Th differs between the image processing modes. For example, the threshold value Th set when the image processing mode is the Botts' dots recognition mode is lower than the threshold value Th set when the image processing mode is the division line recognition mode. The threshold value Th can be made to differ between the image processing modes by adjusting the threshold value Th to the upper limit value of the usable temperature range of the vehicle-mounted camera 2 or to the vicinity of the upper limit value, separately for each image processing mode. The restriction portion 5 restricts the action of the vehicle-mounted camera 2, for example, by restricting the supply of electric power to the vehicle-mounted camera 2. If the supply of electric power to the vehicle-mounted camera 2 is stopped, the action of the vehicle-mounted camera 2 stops.

Figure 3:
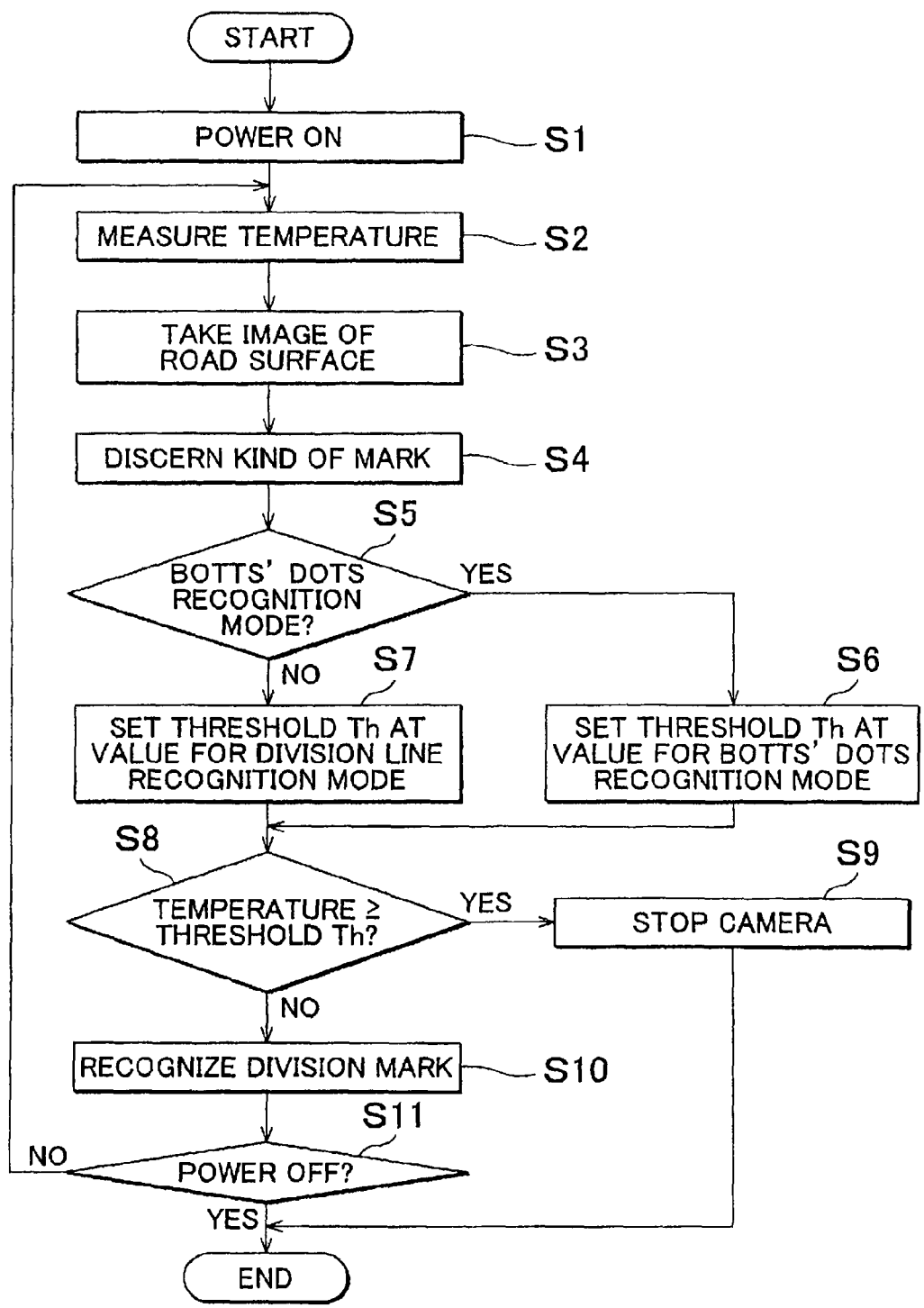
FIG. 3 is a flowchart showing actions of the road surface division mark recognition apparatus in accordance with the first embodiment of the invention.

Next, actions of the road surface division mark recognition apparatus 1 in accordance with this embodiment will be described with reference to the flowchart shown in FIG. 3. Firstly, the power supply of the road surface division mark recognition apparatus 1 is turned on (step S1). Incidentally, the road surface division mark recognition apparatus 1 is incorporated in a system such as the lane departure prevention apparatus 14 or the like. Hence, usually, when the power supply of the system, such as the lane departure prevention apparatus 14 or the like, is turned on, the power supply of the road surface division mark recognition apparatus 1 automatically turns on.

Next, the temperature measurement portion 4 measures the temperature of the vehicle-mounted camera 2 (step S2). Next, the vehicle-mounted camera 2 takes images of the road surface ahead of the vehicle (step S3). Next, the image processing portion 3 discerns the kinds of road surface division marks 8 that are contained in the road surface images taken by the vehicle-mounted camera 2 (step S4). Next, the image processing portion 3 selects, from the plurality of image processing modes, an image 6 processing mode that corresponds to the discerned kind of the road surface division mark 8 (step S5). In the example shown in FIG. 3, it is assumed that the kinds of image processing modes are set to two kinds that are a division line recognition mode (a mode of recognizing a linear road surface division mark 8 as shown in FIG. 2A or 2B), and a Botts' dots recognition mode (a mode of recognizing a road surface division mark 8 formed by circular dots that are aligned as in a dotted line as shown in FIG. 2C).

If the selected image processing mode is the Botts' dots recognition mode, the threshold value Th is set in step S6 to a value that has been determined for used in the Botts' dots recognition mode. On the other hand, if the selected image processing mode is the division line recognition mode, the threshold value Th is set in step S7 to a value that has been determined for use in the division line recognition mode. The threshold value Th for the Botts' dots recognition mode is less than the threshold value Th for the division line recognition mode.

Next, the image processing portion 3 determines whether or not the temperature of the vehicle-mounted camera 2 is higher than or equal to the threshold value Th (step S8). If the temperature of the vehicle-mounted camera 2 is higher than or equal to the threshold value Th, the restriction portion 5 stops the supply of electric power to the vehicle-mounted camera 2 (step S9). Due to this, the vehicle-mounted camera 2 stops acting, and the road surface division mark recognition apparatus 1 ends the process. On the other hand, if the temperature of the vehicle-mounted camera 2 is lower than the threshold value Th, the image processing portion 3 recognizes the road surface division mark 8 in the selected image processing mode (step S10). Next, it is determined whether or not the power supply of the road surface division mark recognition apparatus 1 has been turned off (step S11). If the power supply has not been turned off, the process returns to step S2. On the other hand, if the power supply has been turned off, the road surface division mark recognition apparatus 1 ends the process. Usually, when the power supply of a system, such as the lane departure prevention apparatus 14 or the like, is turned off, the power supply of the road surface division mark recognition apparatus 1 automatically turns off. The road surface division mark recognition apparatus 1 acts in the above-described manner.

As described above, the road surface division mark recognition apparatus 1 makes the threshold value Th different between the image processing modes. The threshold value Th can be made to differ between the image processing modes by adjusting the threshold value Th to the upper limit value of the usable temperature range of the vehicle-mounted camera 2 or to the vicinity of the upper limit value, separately for each image processing mode. Due to this, unnecessary stop of the vehicle-mounted camera 2 at high temperature is avoided, so that the capability of the vehicle-mounted camera 2 can be fully delivered, and the serviceability ratio of the road surface division mark recognition apparatus 1 can be improved.

Figure 4:
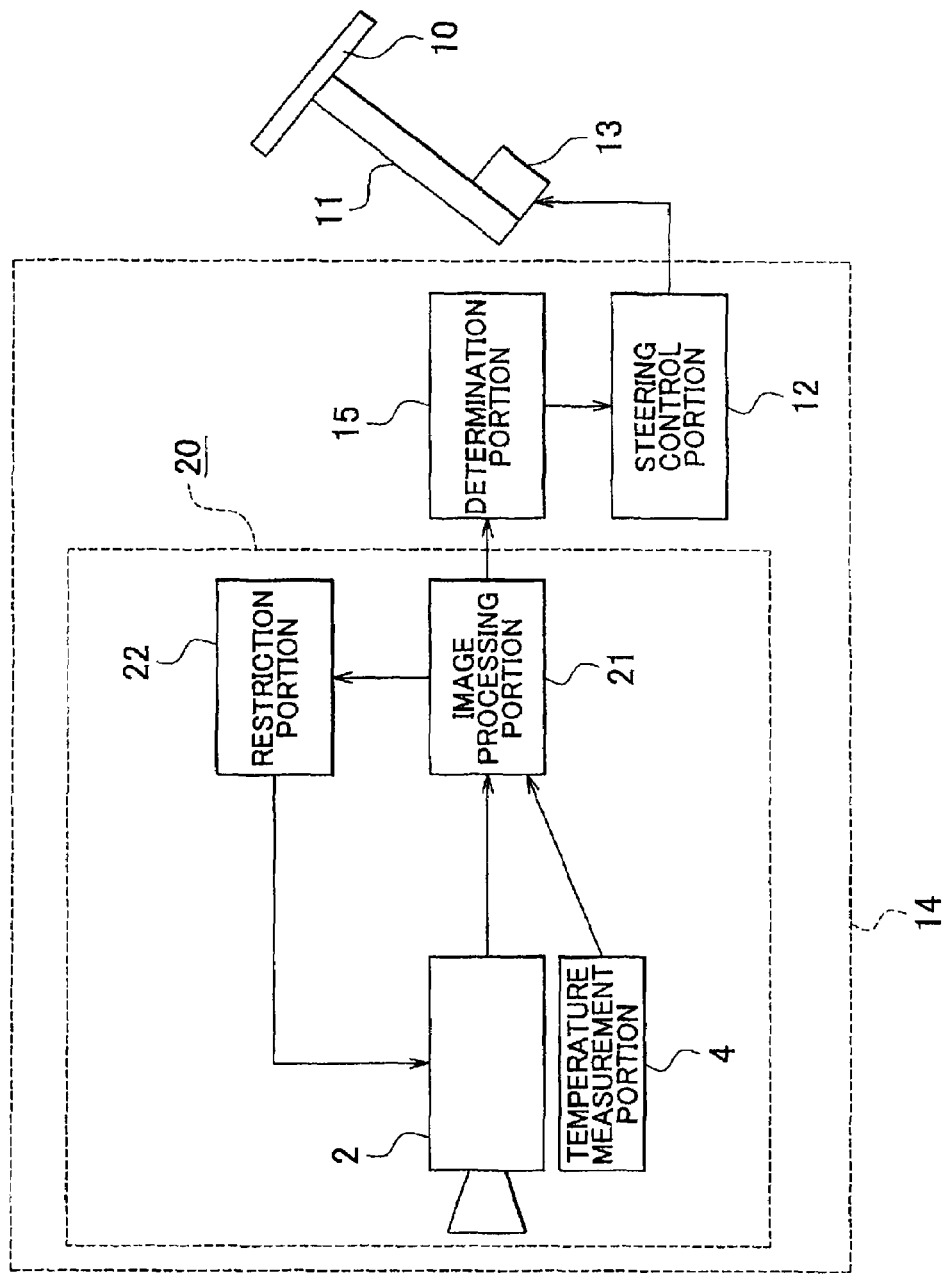
FIG. 4 is a block diagram showing a construction of a road surface division mark recognition apparatus in accordance with a second embodiment of the invention.

A road surface division mark recognition apparatus in accordance with a second embodiment of the invention will be described with reference to drawings. FIG. 4 is a block diagram showing a construction of a road surface division mark recognition apparatus in accordance with the second embodiment.

The road surface division mark recognition apparatus 20 in accordance with the second embodiment shown in FIG. 4 is different from the apparatus 1 in accordance with the first embodiment, in that the image processing portion 3 is replaced by an image processing portion 21, and in that the restriction portion 5 is replaced by a restriction portion 22. Other constructions of the apparatus 20 in the second embodiment are substantially the same as those of the apparatus 1 in the first embodiment. The same constructions as in the first embodiment are denoted by the same reference characters as in the first embodiment, and the description thereof are omitted below.

The image processing portion 21 in the second embodiment calculates an edge point distribution of a region whose brightness is different from those of surrounding regions, on the basis of a road surface image taken by the vehicle-mounted camera 2. Furthermore, the image processing portion 21 calculates the degree of dirtiness of the road surface, and recognizes a road surface division mark 8, on the basis of the calculated edge point distribution. That is, the second embodiment is different from the first embodiment in that the image processing portion 21 calculates the degree or manner of smudginess of the road surface on the basis of the road surface image.

The restriction portion 22 in the second embodiment restricts the action of the vehicle-mounted camera 2 if the temperature measured by the temperature measurement portion 4 is higher than or equal to a threshold value Th2.

Figure 5:
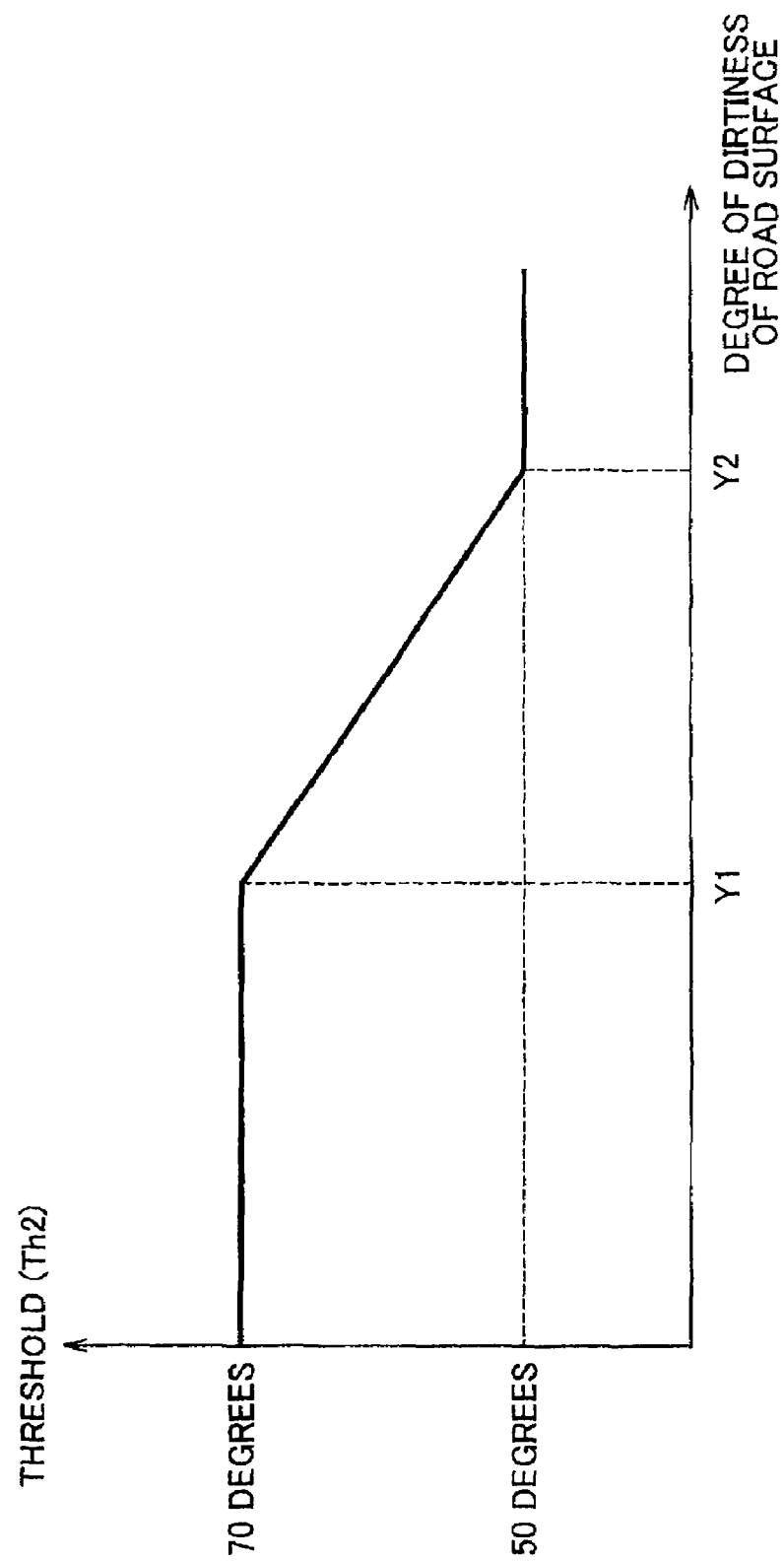
FIG. 5 is a graph showing an example of a relation between the degree of dirtiness of a road surface and a threshold value in the second embodiment of the invention.

Whether or not the temperature measured by the temperature measurement portion 4 is higher than or equal to the threshold value Th2 can be determined by the image processing portion 21. The threshold value Th2 can be set according to the degree of dirtiness of the road surface. The susceptibility to thermal noise during the road surface division mark recognition process is lower (i.e., the robustness to thermal noise during the road surface division mark recognition process is higher) when the degree of dirtiness of the road surface is small than when the degree of dirtiness of the road surface is great. Therefore, when the degree of dirtiness of the road surface is small, the threshold value Th2 can be set higher than when the degree of dirtiness of the road surface is great. For example, as shown in FIG. 5, the threshold value Th2 can be fixed at a constant value when the degree of dirtiness of the road surface is less than or equal to a first value Y1, and the threshold value Th2 can be gradually lessened with increases in the degree of dirtiness of the road surface when the degree of dirtiness is greater than Y1 and is less than or equal to a second value Y2 (Y1<Y2), and the threshold value Th2 can be fixed at a constant value when the degree of dirtiness of the road surface is greater than Y2. In the example shown in FIG. 5, in the interval in which the threshold value Th2 gradually lessens with increases in the degree of dirtiness of the road surface, the threshold value Th2 decreases in the manner of a linear function.

Figure 6:
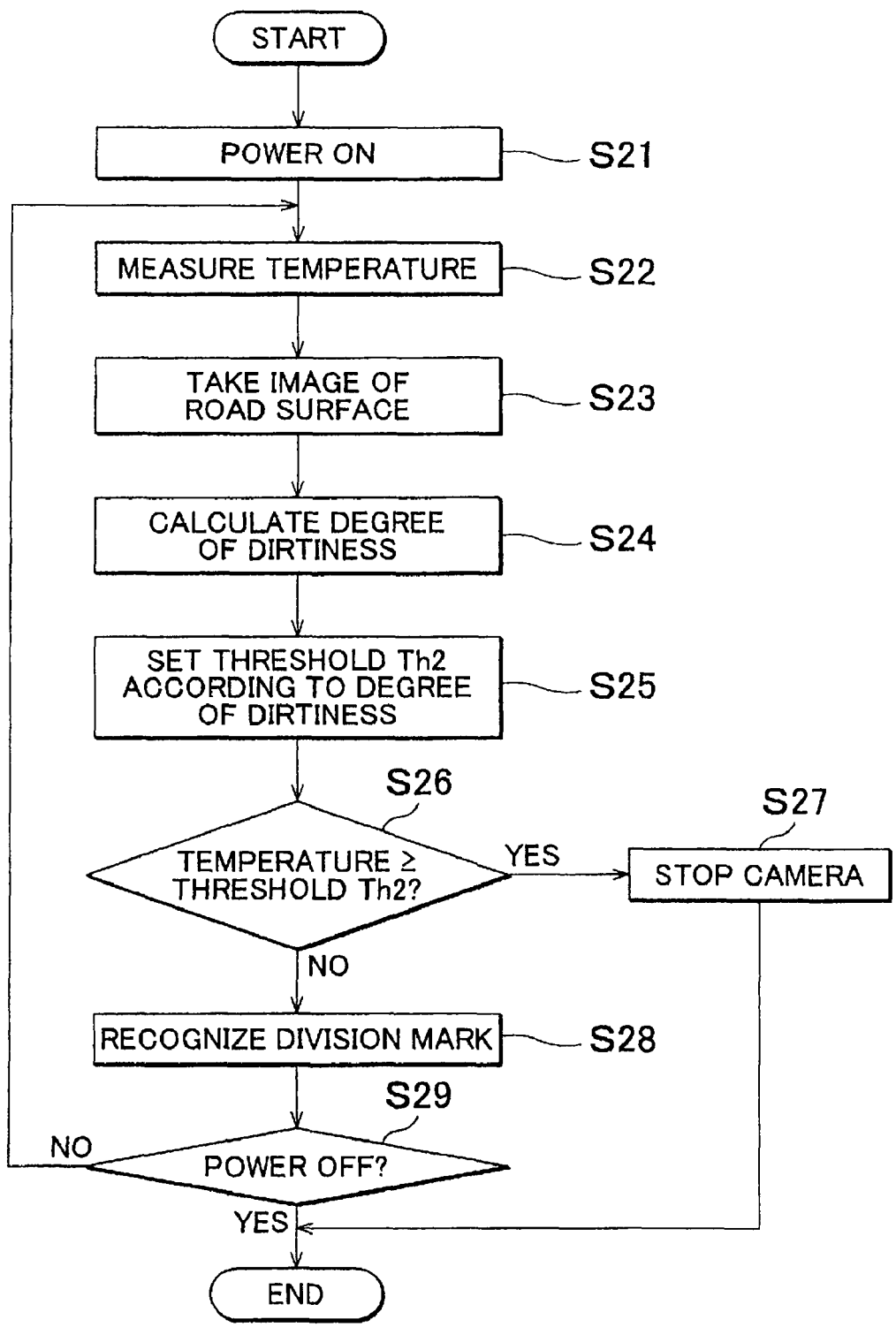
FIG. 6 is a flowchart showing actions of the road surface division mark recognition apparatus in accordance with the second embodiment of the invention.

Next, actions of the road surface division mark recognition apparatus 20 in accordance with this embodiment will be described with reference to the flowchart shown in FIG. 6. Firstly, the power supply of the road surface division mark recognition apparatus 20 is turned on (step S21). Incidentally, the road surface division mark recognition apparatus 20 is incorporated in a system such as the lane departure prevention apparatus 14 or the like. Hence, when the power supply of the system, such as the lane departure prevention apparatus 14 or the like, is turned on, the power supply of the road surface division mark recognition apparatus 20 automatically turns on.

Next, the temperature measurement portion 4 measures the temperature of the vehicle-mounted camera 2 (step S22). Next, the vehicle-mounted camera 2 takes images of the road surface ahead of the vehicle (step S23). Next, the image processing portion 3 calculates the degree of dirtiness of the road surface on the basis of the road surface images taken by the vehicle-mounted camera 2 (step S24). Next, the image processing portion 3 sets the value of the threshold value Th2 according to the degree of dirtiness of the road surface (step S25).

Next, the image processing portion 3 determines whether or not the temperature of the vehicle-mounted camera 2 is higher than or equal to the threshold value Th2 (step S26). If the temperature of the vehicle-mounted camera 2 is higher than or equal to the threshold value Th2, the restriction portion 22 stops the supply of electric power to the vehicle-mounted camera 2 (step S27). Due to this, the vehicle-mounted camera 2 stops acting, and the road surface division mark recognition apparatus 20 ends the process. On the other hand, if the temperature of the vehicle-mounted camera 2 is lower than the threshold value Th2, the image processing portion 3 recognizes the road surface division mark 8 (step S28). Next, it is determined whether or not the power supply of the road surface division mark recognition apparatus 1 has been turned off (step S29). If the power supply has not been turned off, the process returns to step S22. On the other hand, if the power supply has been turned off, the road surface division mark recognition apparatus 20 ends the process. Usually, when the power supply of a system, such as the lane departure prevention apparatus 14 or the like, is turned off, the power supply of the road surface division mark recognition apparatus 20 automatically turns off. The road surface division mark recognition apparatus 20 acts in the above-described manner.

As described above, in the road surface division mark recognition apparatus 20, the threshold value Th2 that is a criterion as to whether or not to restrict the action of the vehicle-mounted camera 2 is set according to the degree of dirtiness of the road surface. The susceptibility to thermal noise during the road surface division mark recognition process is lower in the case where the degree of dirtiness of the road surface is small than in the case where the degree of dirtiness of the road surface is great. Therefore, in the case where the degree of dirtiness of the road surface is small, the threshold value Th2 can be set higher than in the case where the degree of dirtiness of the road surface is great. Hence, unnecessary stop of the vehicle-mounted camera 2 at high temperature is avoided, so that the capability of the vehicle-mounted camera 2 can be fully delivered, and the serviceability ratio of the road surface division mark recognition apparatus 20 can be improved.

Incidentally, although the first and second embodiments have been described in conjunction with the case where the road surface division mark is a mark that defines a traveling lane, the road surface division mark may also be a mark that defines a divided parking space of a parking lot in each embodiment. In such a case, the road surface division mark recognition apparatus is provided as an apparatus for recognizing a divided parking space of a parking lot.

Besides, although the first and second embodiments have been described in conjunction with the case where the vehicle-mounted camera takes images of a road surface ahead of the vehicle, the vehicle-mounted camera may also take images of a road surface in the rear of the vehicle or a road surface at a side of the vehicle in each embodiment. In the case where the vehicle-mounted camera takes images of a road surface in the rear of the vehicle, the road surface division mark recognition apparatus can be provided as an apparatus that recognizes a divided parking space in a parking lot.

Besides, although the first and second embodiments have been described in conjunction with the case where the image processing portion selects an image processing mode from the plurality of image processing modes, the image processing portion may also be constructed so that a user can select an image processing mode from a plurality of image processing modes in each embodiment. Specifically, a construction may also be adopted in which the image processing portion discerns the kind of a road surface division mark contained in a road surface image, and the user selects an image processing mode that corresponds to the discerned road surface division mark from the plurality of image processing modes, and the image processing portion recognizes the road surface division mark in the image processing mode that is selected by the user. In this construction, the user is notified, via a display portion or the like, of the kind of the road surface division mark discerned by the image processing portion, and then selects an image processing mode that corresponds to the discerned kind of the road surface division mark. The image processing portion recognizes the road surface division mark in the image processing mode that is selected by the user.

[Lane Departure Prevention Apparatus]

Figure 7:
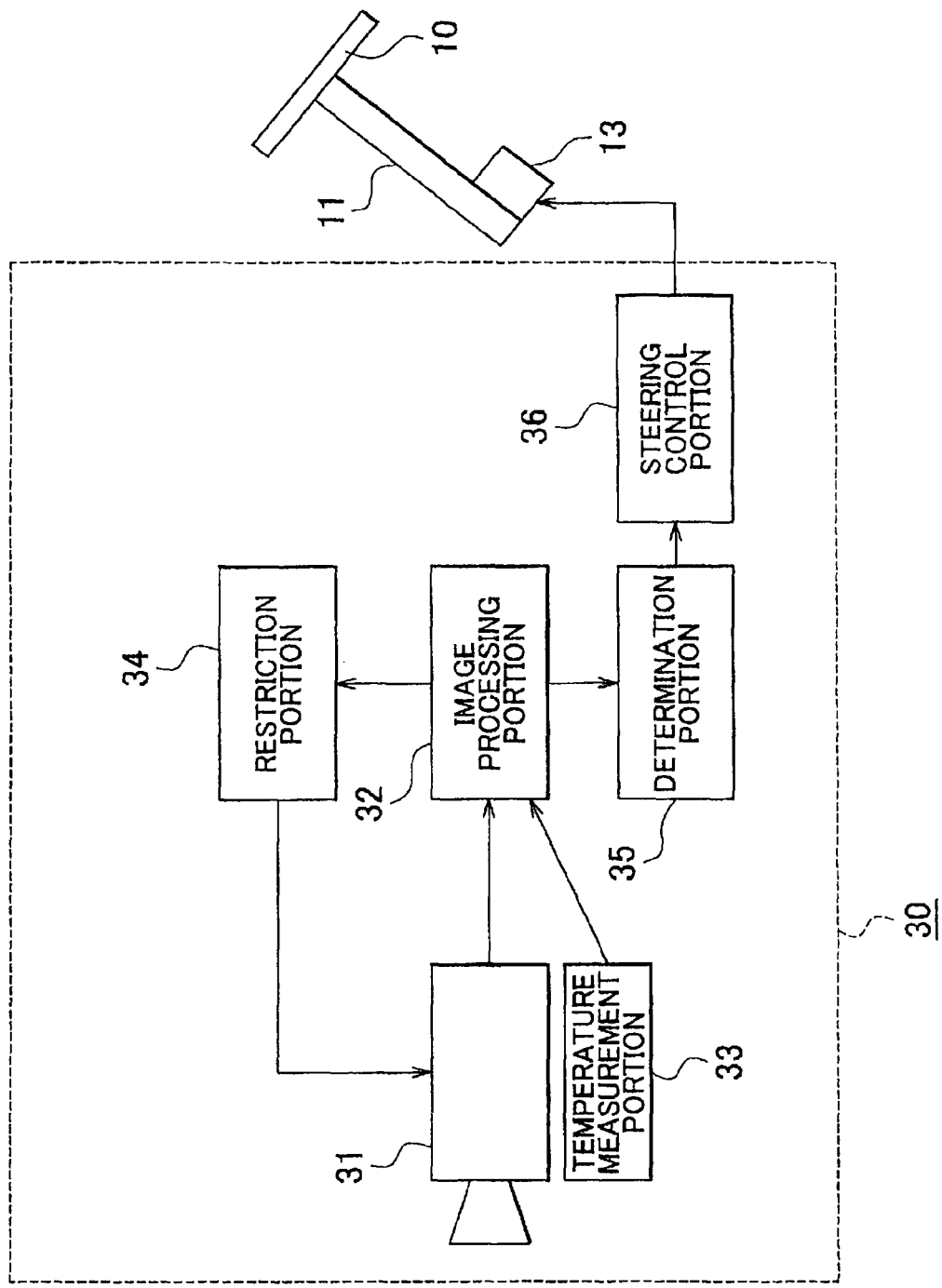
FIG. 7 is a block diagram showing a construction of a lane departure prevention apparatus in accordance with a third embodiment of the invention.

A lane departure prevention apparatus in accordance with a third embodiment of the invention will be described with reference to drawings. FIG. 7 is a block diagram showing a construction of a lane departure prevention apparatus in accordance with the third embodiment.

The lane departure prevention apparatus 30 in accordance with the third embodiment shown in FIG. 7 is an apparatus that prevents a vehicle from departing from the traveling lane. The lane departure prevention apparatus 30 includes a vehicle-mounted camera 31, an image processing portion 32, a temperature measurement portion 33, a restriction portion 34, a determination portion 35, and a steering control portion 36.

The vehicle-mounted camera 31 takes images of a road surface ahead of the vehicle. The vehicle-mounted camera 31 is equipped with, for example, a CCD (charge coupled device), as an image pickup element. The vehicle-mounted camera 31 is disposed, for example, near a cabin-side site on an upper portion of the windshield of the vehicle, and takes images of a road surface ahead of the vehicle, through the windshield.

The temperature measurement portion 33 measures the temperature of the vehicle-mounted camera 31.

The image processing portion 32 recognizes a road surface division mark 8 that defines a traveling lane, on the basis of a road surface image taken by the vehicle-mounted camera 31. The road surface division mark 8 in this embodiment, as described above, is a mark that defines a traveling lane for vehicles on a road surface, and is generally termed a vehicular road center line, a lane-dividing line, a vehicular road outer side line, etc.

The image processing portion 32 recognizes the road surface division mark 8 that defines the traveling lane, on the basis of the road surface image taken by the vehicle-mounted camera 31. The image processing portion 32 is able to recognize the road surface division mark 8 by, for example, processing a road surface image by a known method. Concretely, the image processing portion 32 calculates an edge point distribution of each of regions whose brightness is different from that of a surrounding region, for example, a region whose brightness is conspicuously higher than those of surrounding regions. On the basis of the calculated edge point distributions, the image processing portion 32 recognizes the road surface division mark 8.

The restriction portion 34 restricts the action of the vehicle-mounted camera 31 in the case where the temperature measured by the temperature measurement portion 33 is higher than or equal to a threshold value Th3. The restriction portion 34 restricts the action of the vehicle-mounted camera 31, for example, by restricting the supply of electric power to the vehicle-mounted camera 31. If the supply of electric power to the vehicle-mounted camera 31 is stopped, the action of the vehicle-mounted camera 31 stops.

The determination portion 35 determines the possibility of the vehicle departing from the traveling lane, on the basis of a result of the recognition of the image processing portion 32.

The steering control portion 36 controls the steering so that the vehicle does not depart from the traveling lane, on the basis of a result of the determination of the determination portion 35. Concretely, the steering control portion 36 controls a power steering motor 13 that rotates and drives a steering shaft 11. By the steering control portion 36 controlling the power steering motor 13, rotary torque is given to the steering shaft 11 so as to prevent lane departure of the vehicle. A steering wheel 10 is fitted to the steering shaft 11. THE steering control portion 36 controls the rotary torque by changing a control gain G of the rotary torque that is given to the steering shaft 11. The control gain G is a control parameter of the rotary torque that is given to the steering shaft 11. The rotary torque Tr given to the steering shaft 11 can be expressed by, for example, the following equation 1. Incidentally, description of a power steering mechanism that amplifies the driver's steering force is omitted herein.

$$Tr = T \times G \qquad \text{(equation 1)}$$

In the equation 1, T is a maximum value of the rotary torque Tr that is given to the steering shaft 11 according to a command from the steering control portion 36. The control gain G can be changed in the range of 0 to 1, for example, according to the vehicle speed, and the driver's steering force. Concretely, the control gain G can be gradually lessened with increases in the vehicle speed. This is because when the vehicle speed is great, application of merely small rotary torque greatly changes the position of the vehicle in the steering direction of the steering control portion 36. Besides, the control gain G can be gradually lessened with increases in the driver's steering force. This is because when the driver's steering force is great, application of merely small rotary torque brings about a sufficient angle of steering. Incidentally, the vehicle speed is detected by a vehicle speed sensor (not shown), and the driver's steering force is detected by a steering force sensor (not shown).

The threshold value Th3 is set according to the magnitude of the control gain G. For example, the control gain G is set so that the threshold value Th3 gradually becomes higher with reductions in the control gain G. This is because the degree of deterioration of the steering feeling in the case where the vehicle-mounted camera 31 is affected by thermal noise reduces with reductions of the control gain G.

Figure 8:
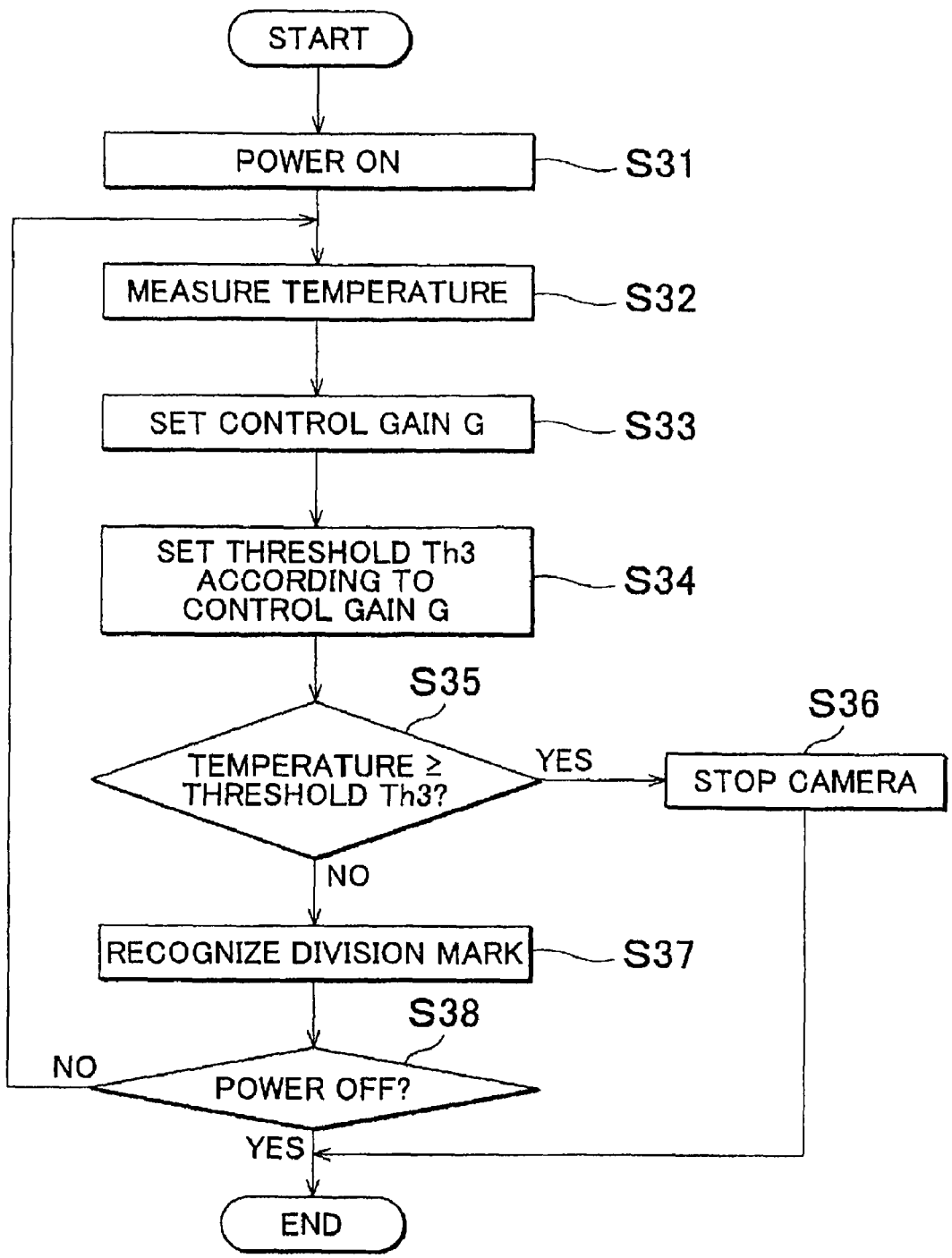
FIG. 8 is a flowchart showing actions of the lane departure prevention apparatus in accordance with the third embodiment of the invention.

Next, actions of the lane departure prevention apparatus 30 in accordance with this embodiment will be described with reference to a flowchart shown in FIG. 8. Firstly, the power supply of the lane departure prevention apparatus 30 is turned on (step S31). Next, the temperature measurement portion 33 measures the temperature of the vehicle-mounted camera 31 (step S32). Next, the control gain G is set according to the vehicle speed and the driver's steering force (step S33). Next, the threshold value Th3 is set according to the control gain G (step S34).

Next, the image processing portion 32 determines whether or not the temperature of the vehicle-mounted camera 31 is higher than or equal to the threshold value Th3 (step S35). If the temperature of the vehicle-mounted camera 31 is higher than or equal to the threshold value Th3, the restriction portion 34 stops the supply of electric power to the vehicle-mounted camera 31 (step S36). Due to this, the vehicle-mounted camera 31 stops acting, and the lane departure prevention apparatus 30 ends the process. On the other hand, if the temperature of the vehicle-mounted camera 31 is lower than the threshold value Th3, the image processing portion 32 recognizes the road surface division mark 8 (step S37). Next, it is determined whether or not the power supply of the lane departure prevention apparatus 30 has been turned off (step S38). If the power supply has not been turned off, the process returns to step S32. On the other hand, if the power supply has been turned off, the lane departure prevention apparatus 30 ends the process. The lane departure prevention apparatus 30 acts in the above-described manner.

As described above, according to this embodiment, the threshold value Th3 that is a criterion as to whether or not to restrict the action of the vehicle-mounted camera 31 is set according to the magnitude of the control gain G. For example, the threshold value Th3 can be set higher with reductions in the control gain G. Due to this, unnecessary stop of the vehicle-mounted camera 31 at high temperature is avoided, so that the capability of the vehicle-mounted camera 31 can be fully delivered, and the serviceability ratio of the lane departure prevention apparatus 30 can be improved.

Figure 9:
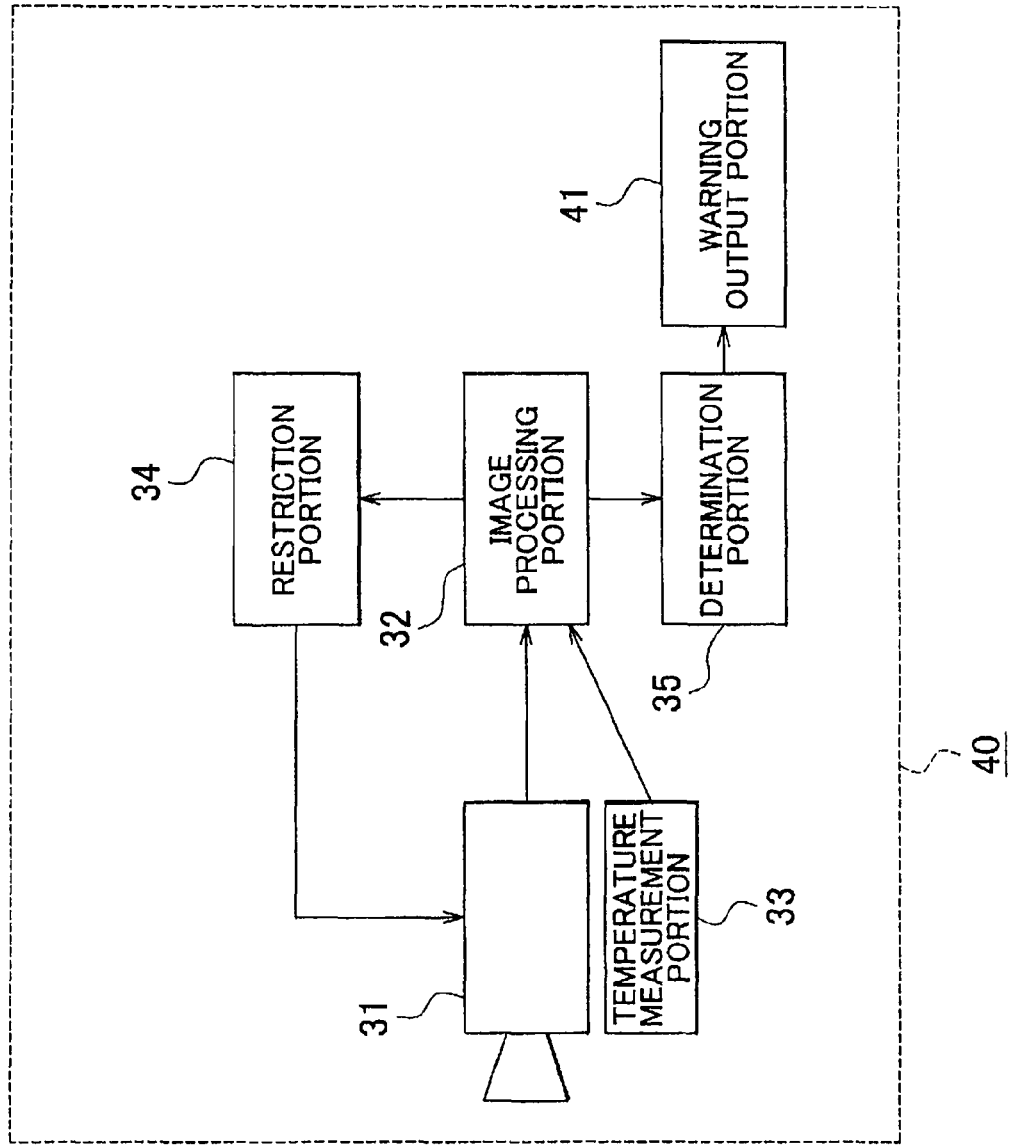
FIG. 9 is a block diagram showing a construction of a lane departure prevention apparatus in accordance with a fourth embodiment of the invention.

A lane departure prevention apparatus in accordance with a fourth embodiment of the invention will be described with reference to drawings. FIG. 9 is a block diagram showing a construction of a lane departure prevention apparatus in accordance with a fourth embodiment.

A lane departure prevention apparatus 40 in accordance with the fourth embodiment is different from the apparatus of the third embodiment, in that the steering control portion 36 is omitted, and a warning output portion 41 is provided. Other constructions of the fourth embodiment are substantially the same as those of the third embodiment. The same constructions as in the third embodiment are denoted by the same reference characters as in the third embodiment, and the description thereof is omitted below.

The warning output portion 41 outputs a warning that indicates a possibility of the vehicle departing from the traveling lane, before the vehicle actually departs therefrom, on the basis of a result of the determination of the determination portion 35.

The restriction portion 34 restricts the action of the vehicle-mounted camera 31 if the temperature measured by the temperature measurement portion 33 is higher than or equal to a threshold value Th4. The restriction portion 34 restricts the action of the vehicle-mounted camera 31, for example, by restricting the supply of electric power to the vehicle-mounted camera 31. The threshold value Th4 is set according to the warning timing T that is set in the warning output portion 41. The warning timing T is a time that indicates how many seconds prior to an expected time of departure of the vehicle from the traveling lane the warning is to be output. The warning timing T can be set according to the vehicle speed and the road width. For example, the warning timing T is set shorter with increases in the vehicle speed. Besides, the warning timing T is set shorter with decreases in the road width. If the warning timing T is shorter (e.g., if the warning time is later), the accuracy of the recognition of the road surface division mark 8 is higher. A reason for this is that when the warning timing T is long (i.e., when the warning time is early), road surface information needs to be acquired about a farther forward area of the road surface than when the warning timing T is short, and therefore the influence of noise is greater. Therefore, the threshold value Th4 can be set to be gradually higher with reductions in the warning timing T.

Figure 10:
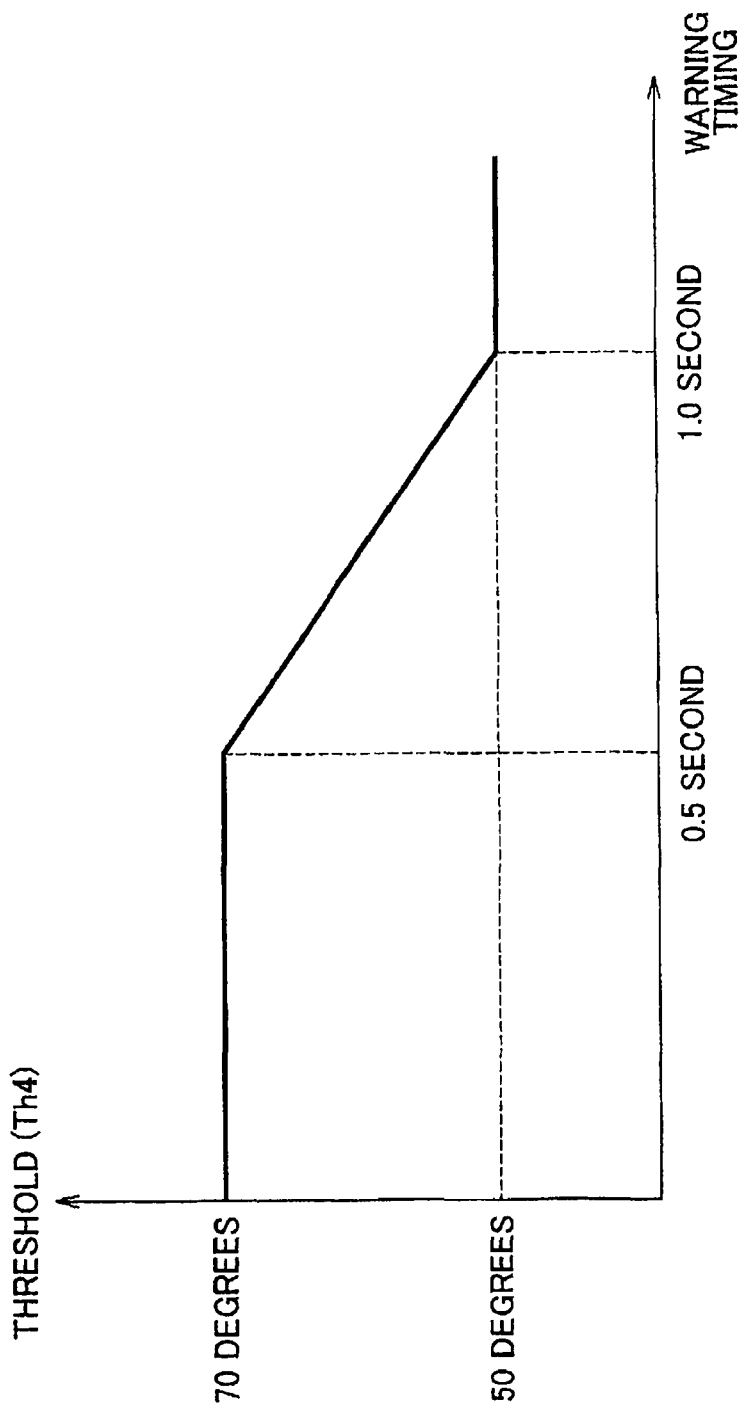
FIG. 10 is a graph showing an example of a relation between the warning timing and a threshold value in the fourth embodiment of the invention.

FIG. 10 is a graph showing an example of a relation between the warning timing T and the threshold value Th4. In the example shown in FIG. 10, the threshold value Th4 is fixed when the warning timing T is less than or equal to 0.5 second, and the threshold value Th4 is gradually lessened with increases in the warning timing T in the range of 0.5 to 1.0 second, and the threshold value Th4 is fixed when the warning timing T is greater than the 1.0 second. In the example shown in FIG. 10, in the interval of the threshold value Th4 of 0.5 to 1.0 second, the threshold value Th4 declines in the manner of a linear function.

Figure 11:
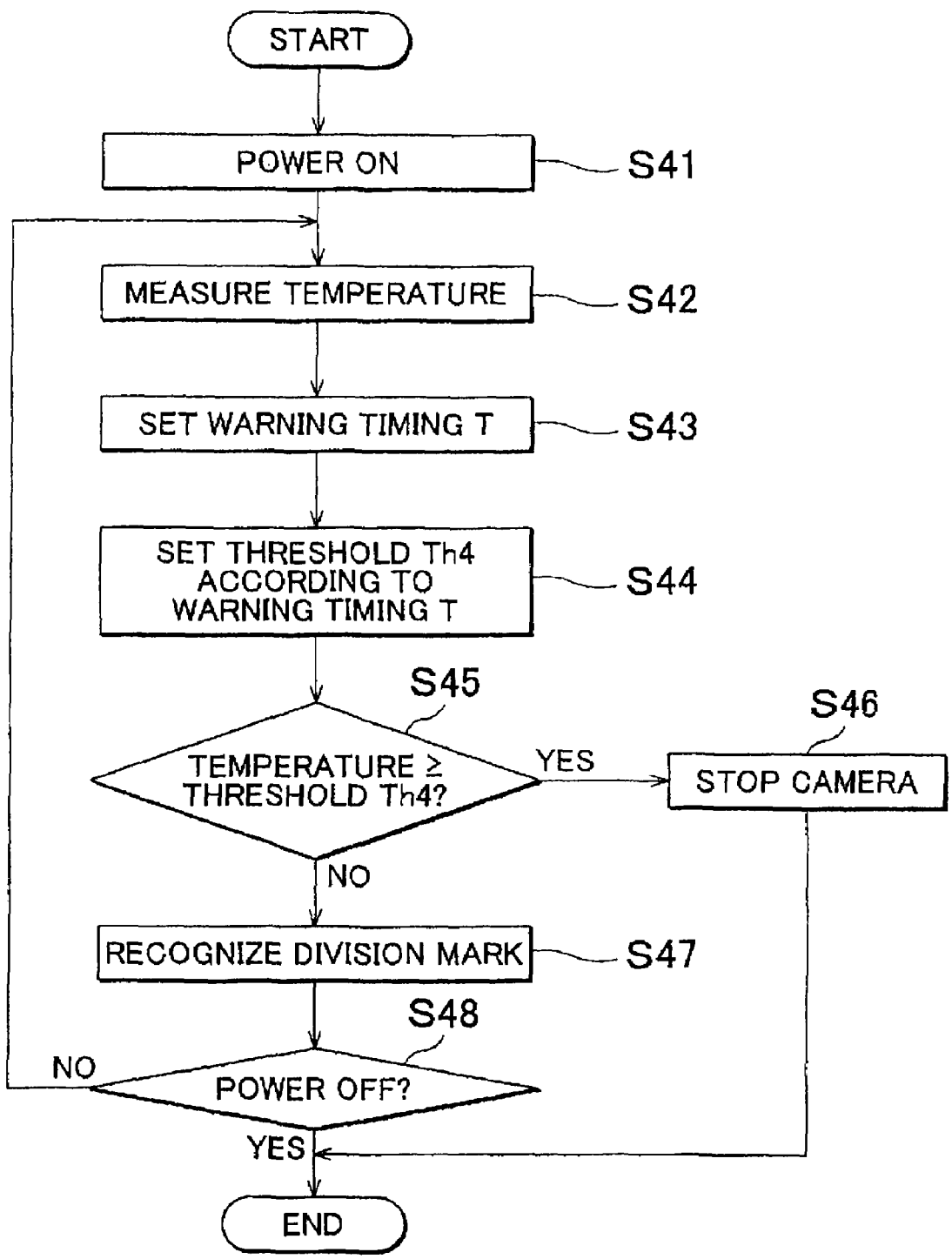
FIG. 11 is a flowchart showing actions of the lane departure prevention apparatus in accordance with the fourth embodiment of the invention.

Next, actions of the lane departure prevention apparatus 40 in accordance with this embodiment will be described with reference to the flowchart shown in FIG. 11. Firstly, the power supply of the lane departure prevention apparatus 40 is turned on (step S41). Next, the temperature measurement portion 33 measures the temperature of the vehicle-mounted camera 31 (step S42). Next, the warning timing T is set according to the vehicle speed and the road width (step S43). Next, the threshold value Th4 is set according to the warning timing T (step S44).

Next, the image processing portion 32 determines whether or not the temperature of the vehicle-mounted camera 31 is higher than or equal to the threshold value Th4 (step S45). If the temperature of the vehicle-mounted camera 31 is higher than or equal to the threshold value Th4, the restriction portion 34 stops the supply of electric power to the vehicle-mounted camera 31 (step S46). Due to this, the vehicle-mounted camera 31 stops acting, and the lane departure prevention apparatus 40 ends the process. On the other hand, if the temperature of the vehicle-mounted camera 31 is lower than the threshold value Th4, the image processing portion 32 recognizes the road surface division mark 8 (step S47). Next, it is determined whether or not the power supply of the lane departure prevention apparatus 40 has been turned off (step S48). If the power supply has not been turned off, the process returns to step S42. On the other hand, if the power supply has been turned off, the lane departure prevention apparatus 40 ends the process. The lane departure prevention apparatus 40 acts in the above-described manner.

As described above, according to this embodiment, the threshold value Th4 that is a criterion as to whether to restrict the action of the vehicle-mounted camera 31 is set according to the warning timing T. In the case where the warning timing T is short, the recognition accuracy of the road surface division mark 8 is higher than in the case where the warning timing T is long. Therefore, the threshold value Th4 can be set higher in the case where the warning timing T short than in the case where the warning timing T is long. Hence, unnecessary stop of the vehicle-mounted camera 31 at high temperature is avoided, so that the capability of the vehicle-mounted camera 31 can be fully delivered, and the serviceability ratio of the lane departure prevention apparatus 40 can be improved.

Figure 12:
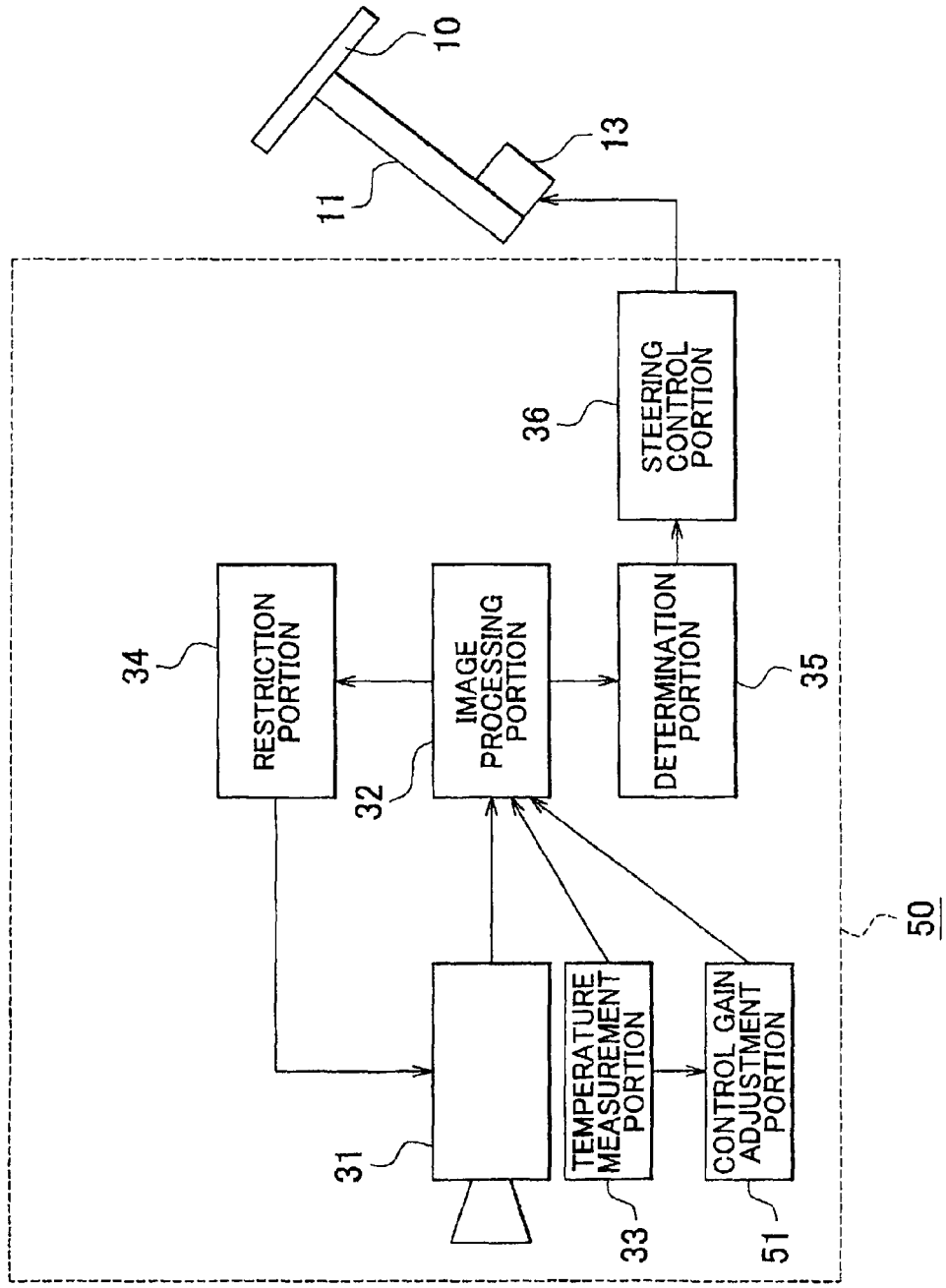
FIG. 12 is a block diagram showing a construction of a lane departure prevention apparatus in accordance with a fifth embodiment of the invention.

A lane departure prevention apparatus in accordance with a fifth embodiment of the invention will be described with reference to drawings. FIG. 12 is a block diagram showing a construction of a lane departure prevention apparatus in accordance with the fifth embodiment.

The lane departure prevention apparatus 50 in accordance with the fifth embodiment shown in FIG. 12 is different from the apparatus of the third embodiment in that a control gain adjustment portion 51 is provided. Other constructions of the fifth embodiment are the same as those of the third embodiment. The same constructions as in the third embodiment are denoted by the same reference characters as in the third embodiment, and the description thereof is omitted below.

The control gain adjustment portion 51 adjusts the control gain G according to the temperature measured by the temperature measurement portion 33. For example, the control gain G is adjusted so that the control gain G lessens with increases in the temperature of the vehicle-mounted camera 31. Due to this, good steering feeling can be maintained even in the case where the vehicle-mounted camera 31 is affected by thermal noise. Incidentally, the action of the vehicle-mounted camera 31 may be restricted, or may also be left unrestricted.

Next, actions of the lane departure prevention apparatus 50 in accordance with this embodiment will be described with reference to the flowchart shown in FIG. 13. Firstly, the power supply of the lane departure prevention apparatus 50 is turned on (step S51). Next, the temperature measurement portion 33 measures the temperature of the vehicle-mounted camera 31 (step S52). Next, the control gain G is set according to the vehicle speed, the driver's steering force, and the temperature of the vehicle-mounted camera 31 (step S53). Next, a threshold value Th5 is set according to the control gain G (step S54).

Next, the image processing portion 32 determines whether or not the temperature of the vehicle-mounted camera 31 is higher than or equal to the threshold value Th5 (step S55). If the temperature of the vehicle-mounted camera 31 is higher than or equal to the threshold value Th5, the restriction portion 34 stops the supply of electric power to the vehicle-mounted camera 31 (step S56). Due to this, the vehicle-mounted camera 31 stops acting, and the lane departure prevention apparatus 50 ends the process. On the other hand, if the temperature of the vehicle-mounted camera 31 is lower than the threshold value Th5, the image processing portion 32 recognizes the road surface division mark 8 (step S57). Next, it is determined whether or not the power supply of the lane departure prevention apparatus 50 has been turned off (step S58). If the power supply has not been turned off, the process returns to step S52. On the other hand, if the power supply has been turned off, the lane departure prevention apparatus 50 ends the process. The lane departure prevention apparatus 50 acts in the above-described manner.

Figure 13:
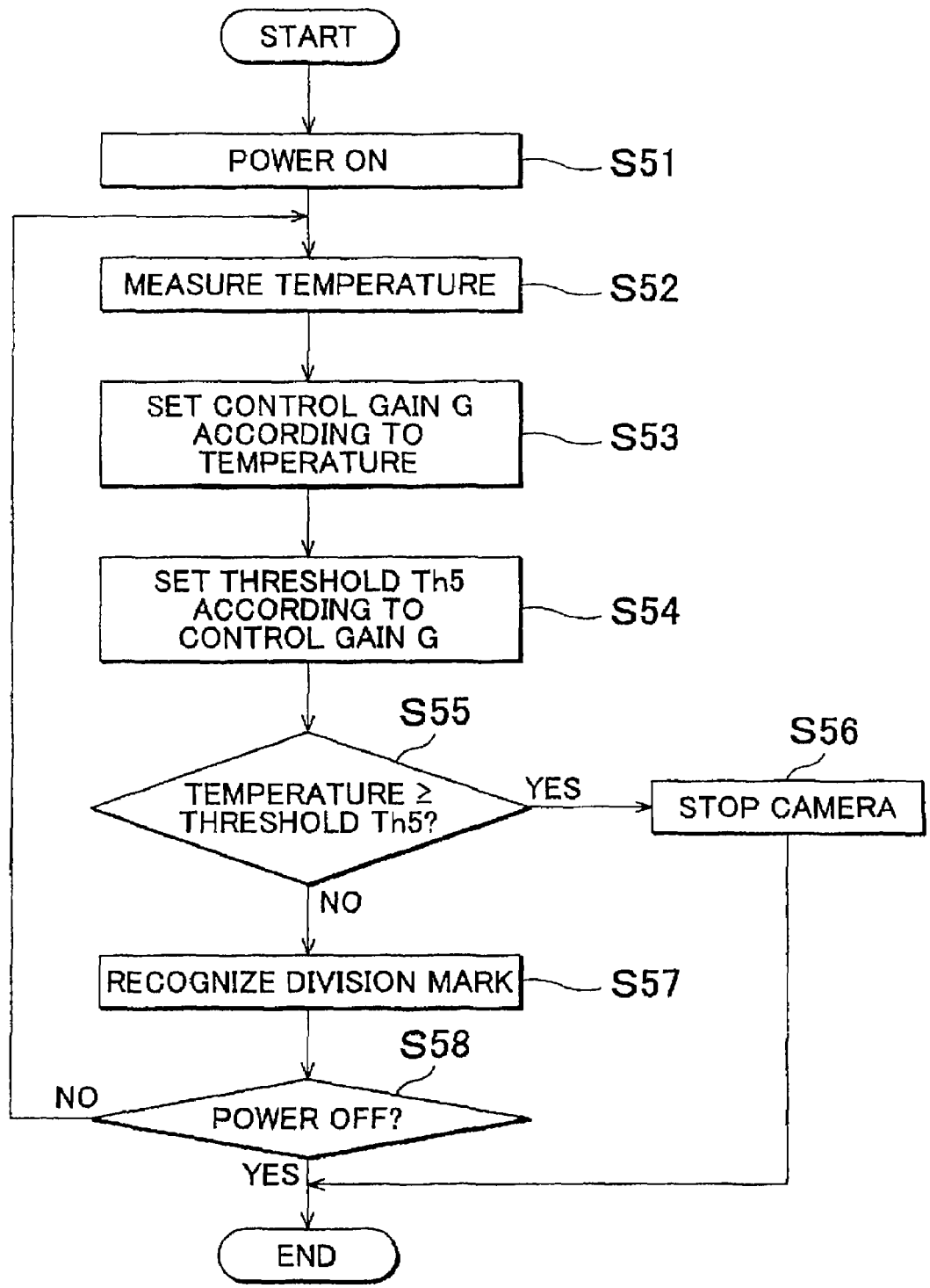
FIG. 13 is a flowchart showing actions of the lane departure prevention apparatus in accordance with the fifth embodiment of the invention.

Incidentally, in the example shown in FIG. 13, the threshold value Th5 is set, and the vehicle-mounted camera 31 is stopped if the temperature of the vehicle-mounted camera 31 is higher than or equal to the threshold value Th5. However, in this embodiment, it is also permissible to omit the setting of the threshold value Th5 and omit the stopping of the vehicle-mounted camera 31 by the restriction portion 34.

As described above, according to this embodiment, the control gain adjustment portion 51 adjusts the control gain G according to the temperature of the vehicle-mounted camera 31. For example, the control gain G is adjusted so that the control gain G lessens with increases in the temperature of the vehicle-mounted camera 31. Due to this, good steering feeling can be maintained even in the case where the vehicle-mounted camera 31 is affected by thermal noise. Besides, unnecessary stop of the vehicle-mounted camera 31 at high temperature is avoided, so that the serviceability ratio of the lane departure prevention apparatus 50 can be improved.

Figure 14:
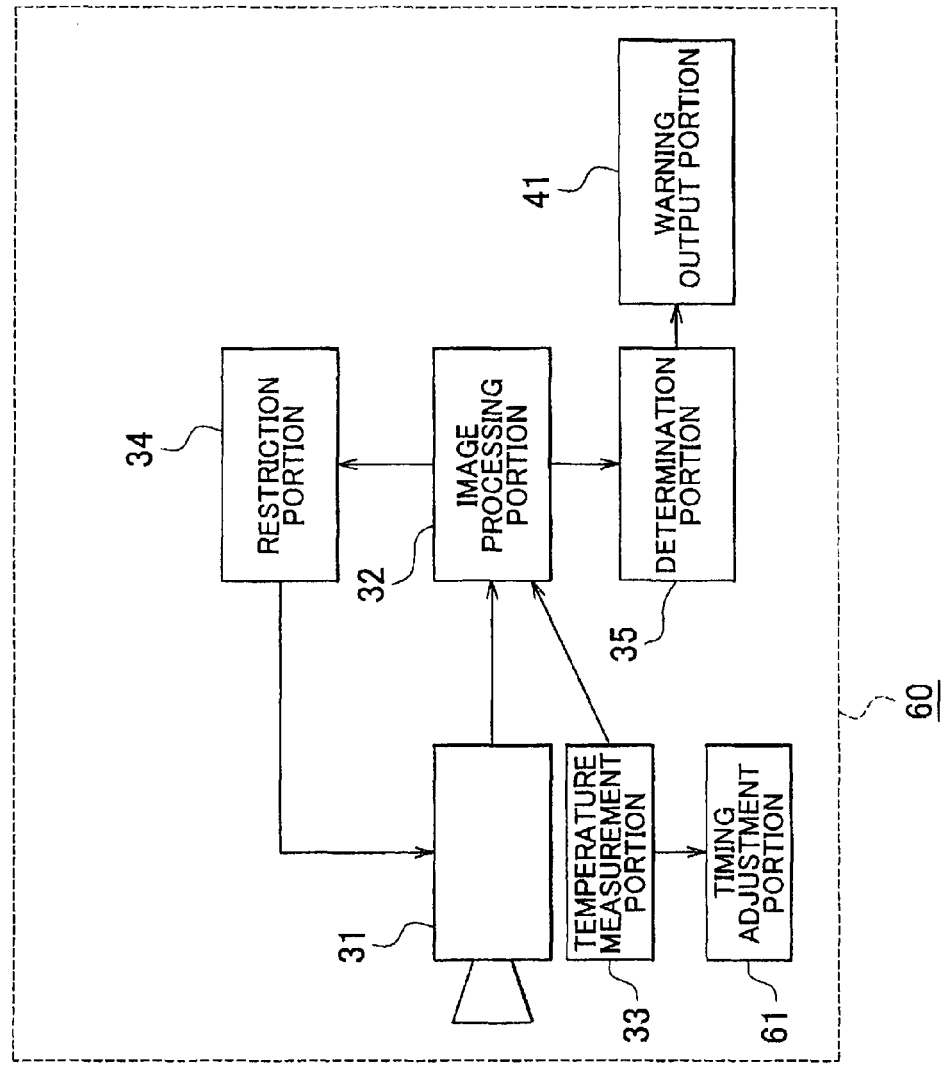
FIG. 14 is a block diagram showing a construction of a lane departure prevention apparatus in accordance with a sixth embodiment of the invention.

A lane departure prevention apparatus in accordance with a sixth embodiment of the invention will be described with reference to drawings. FIG. 14 is a block diagram showing a construction of a lane departure prevention apparatus in accordance with the sixth embodiment.

The lane departure prevention apparatus 60 in accordance with the sixth embodiment shown in FIG. 14 is different from the apparatus of the fourth embodiment, in that a timing adjustment portion 61 is provided. Other constructions of the sixth embodiment are substantially the same as those of the fourth embodiment. The same constructions as in the fourth embodiment are denoted by the same reference characters as in the fourth embodiment, and the description thereof is omitted below.

The timing adjustment portion 61 adjusts the warning timing T according to the temperature measured by the temperature measurement portion 33. The recognition accuracy of the road surface division mark 8 is higher in the case where the warning timing T is short than in the case where the warning timing T is long. A reason for this is that when the warning timing T is long, road surface information needs to be acquired about a farther forward area of the road surface than when the warning timing T is short, and therefore the influence of noise is greater. Hence, the warning timing T is adjusted so that the warning timing T shortens with increases in the temperature of the vehicle-mounted camera 31. Due to this, false warning output can be prevented even in the case where the vehicle-mounted camera 31 is affected by thermal noise.

Next, actions of the lane departure prevention apparatus 60 in accordance with this embodiment will be described with reference to the flowchart shown in FIG. 15. Firstly, the power supply of the lane departure prevention apparatus 60 is turned on (step S61). Next, the temperature measurement portion 33 measures the temperature of the vehicle-mounted camera 31 (step S62). Next, the warning timing T is set according to the vehicle speed, the road width, and the temperature measured by the temperature measurement portion 33 (step S63). Next, a threshold value Th6 is set according to the warning timing T (step S64).

Next, the image processing portion 32 determines whether or not the temperature of the vehicle-mounted camera 31 is higher than or equal to the threshold value Th6 (step S65). If the temperature of the vehicle-mounted camera 31 is higher than or equal to the threshold value Th6, the restriction portion 34 stops the supply of electric power to the vehicle-mounted camera 31 (step S66). Due to this, the vehicle-mounted camera 31 stops acting, and the lane departure prevention apparatus 60 ends the process. On the other hand, if the temperature of the vehicle-mounted camera 31 is lower than the threshold value Th6, the image processing portion 32 recognizes the road surface division mark 8 (step S67). Next, it is determined whether or not the power supply of the lane departure prevention apparatus 60 has been turned off (step S68). If the power supply has not been turned off, the process returns to step S62. On the other hand, if the power supply has been turned off, the lane departure prevention apparatus 60 ends the process. The lane departure prevention apparatus 60 acts in the above-described manner.

Figure 15:
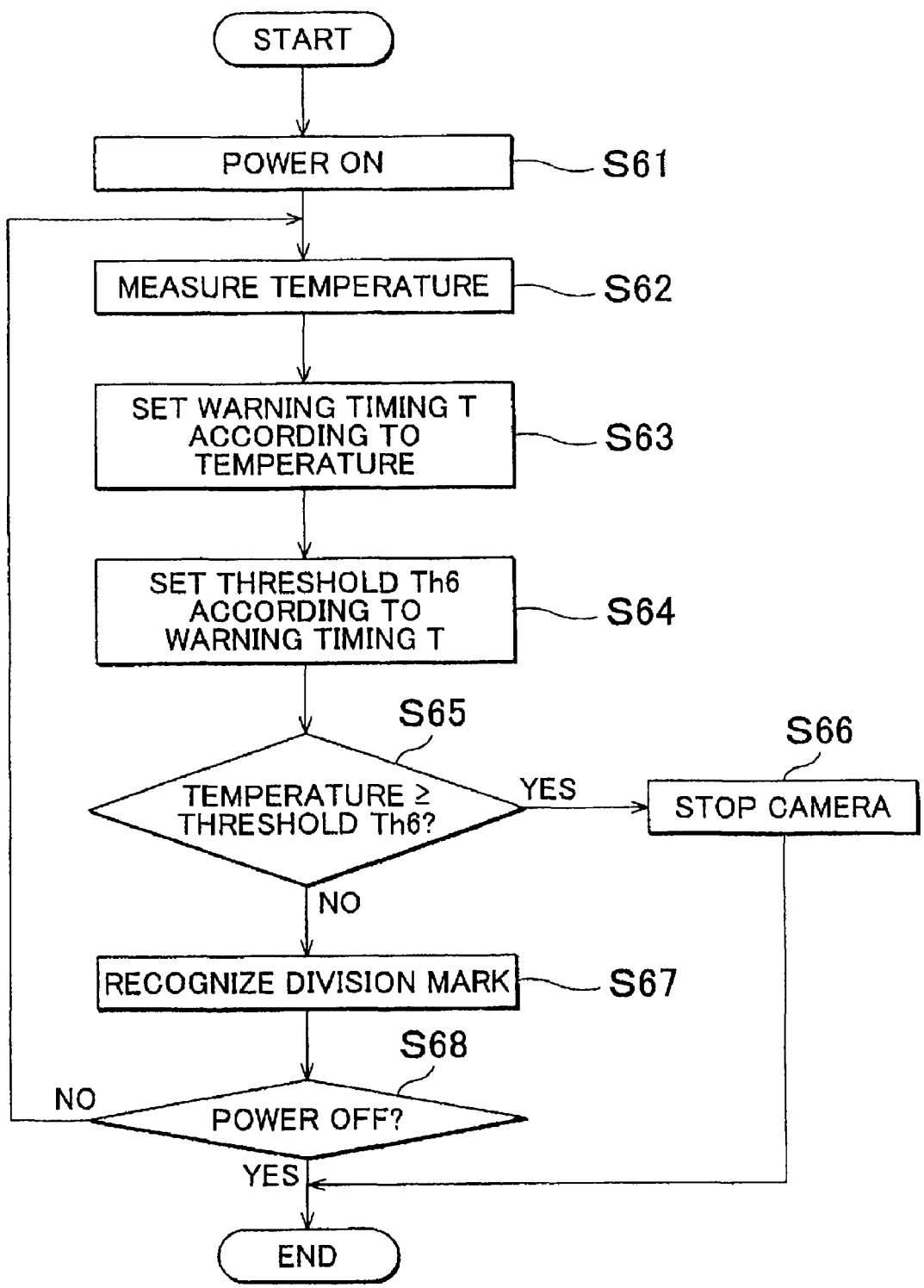
FIG. 15 is a flowchart showing actions of the lane departure prevention apparatus in accordance with the sixth embodiment of the invention.

Incidentally, in the example shown in FIG. 15, the threshold value Th6 is set, and the vehicle-mounted camera 31 is stopped if the temperature of the vehicle-mounted camera 31 is higher than or equal to the threshold value Th6. However, in this embodiment, it is also permissible to omit the setting of the threshold value Th6 and omit the stopping of the vehicle-mounted camera 31 by the restriction portion 34.

As described above, according to this embodiment, the timing adjustment portion 61 adjusts the warning timing T according to the temperature of the vehicle-mounted camera 31. The recognition accuracy of the road surface division mark 8 is higher in the case where the warning timing T is short than in the case where the warning timing T is long. Hence, the warning timing T is adjusted so that the warning timing T shortens with increases in the temperature of the vehicle-mounted camera 31. Due to this, false warning output can be prevented even in the case where the vehicle-mounted camera 31 is affected by thermal noise. Besides, unnecessary stop of the vehicle-mounted camera 31 at high temperature is avoided, so that the serviceability ratio of the lane departure prevention apparatus 60 can be improved.

What is claimed is:

1. A road surface division mark recognition apparatus that recognizes a division mark on a road surface, comprising:
    a vehicle-mounted camera that takes an image of the road surface;
    an image processing portion which has a plurality of image processing modes that correspond respectively to a plurality of kinds of road surface division marks, which discerns the kind of the road surface division mark contained in the road surface image taken by the vehicle-mounted camera, which makes it possible to select, from the plurality of image processing modes, one image processing mode that corresponds to the road surface division mark discerned, and which recognizes the road surface division mark in the selected image processing mode;

a temperature measurement portion that measures temperature of the vehicle-mounted camera; and a restriction portion that restricts action of the vehicle-mounted camera if the temperature measured by the temperature measurement portion is higher than or equal to a threshold value, wherein the threshold value differs among the image processing modes.

2. The road surface division mark recognition apparatus according to claim 1, wherein the restriction portion restricts the action of the vehicle-mounted camera by restricting supply of electric power to the vehicle-mounted camera.

3. The road surface division mark recognition apparatus according to claim 1, wherein the threshold value is set lower when the image processing mode is a Botts' dots recognition mode than when the image processing mode is a division line recognition mode.

4. The road surface division mark recognition apparatus according to claim 1, wherein the image processing portion, after discerning the kind of the road surface division mark, selects, from the plurality of image processing modes, the one image processing mode that corresponds to the road surface division mark discerned.

* * * * *